United States Patent
Kämpchen et al.

(10) Patent No.: US 7,684,590 B2
(45) Date of Patent: Mar. 23, 2010

(54) METHOD OF RECOGNIZING AND/OR TRACKING OBJECTS

(75) Inventors: Nico Kämpchen, Ulm (DE); Ulrich Lages, Hamburg (DE); Kay Fürstenberg, Ulm (DE); Klaus Dietmayer, Ulm (DE)

(73) Assignee: IBEO Automobile Sensor GmbH, Hamburg (DE)

( * ) Notice: Subject to any disclaimer, the term of this patent is extended or adjusted under 35 U.S.C. 154(b) by 1374 days.

(21) Appl. No.: 11/108,430

(22) Filed: Apr. 18, 2005

(65) Prior Publication Data

US 2005/0232466 A1 Oct. 20, 2005

(30) Foreign Application Priority Data

Apr. 19, 2004 (DE) .................. 10 2004 018 813

(51) Int. Cl.
 *G06K 9/00* (2006.01)
(52) U.S. Cl. ...................... 382/103; 382/104
(58) Field of Classification Search .......... 382/103, 382/104, 107
See application file for complete search history.

(56) References Cited

U.S. PATENT DOCUMENTS

| | | | |
|---|---|---|---|
| 6,437,820 | B1 | 8/2002 | Josefsson et al. |
| 6,480,615 | B1 * | 11/2002 | Sun et al. .................... 382/103 |
| 6,967,674 | B1 | 11/2005 | Lausch et al. |
| 2003/0206305 | A1 * | 11/2003 | Gagliano .................... 356/601 |
| 2006/0062472 | A1 | 3/2006 | Engelberg et al. |
| 2006/0109169 | A1 * | 5/2006 | Winter et al. ................. 342/70 |

FOREIGN PATENT DOCUMENTS

| | | |
|---|---|---|
| DE | 19962201 | 3/2001 |
| DE | 10148070 | 4/2003 |

(Continued)

OTHER PUBLICATIONS

Barron, J.L., et al.; "Performance of Optical Flow Techniques," IJCV 12:1, pp. 43-77; 1994 (60 pages).
Beauchemin, S.S., et al.; "The Computation of Optical Flow,"ACM Computing Surveys, vol. 27, No. 3, Sep. 1995; pp. 433-467.

(Continued)

*Primary Examiner*—Samir A. Ahmed
*Assistant Examiner*—Amara Abdi
(74) *Attorney, Agent, or Firm*—Harness, Dickey & Pierce, P.L.C.

(57) ABSTRACT

In a method of recognizing and/or tracking objects which correspond to real objects in at least one sensing zone of at least one sensor for electromagnetic radiation on the basis of images of the sensing zone repeatedly sensed by means of the sensor, succeeding images are evaluated in succeeding cycles and a search is made for at least one respective object found in a cycle on the basis of a corresponding image in a correspondingly later image in a later cycle to track the object. At least one part of an earlier image and/or at least one indication with respect to an earlier state of the object or of a real object corresponding to it, which is determined using a corresponding earlier image in the current cycle, is associated with at least one part of a current image determined in the current cycle or with an object recognized in the current cycle during at least one current cycle on the basis of the results of an at least preliminary evaluation of a current image.

15 Claims, 16 Drawing Sheets

FOREIGN PATENT DOCUMENTS

| | | |
|---|---|---|
| DE | 10226257 | 12/2003 |
| DE | 10312249 | 9/2004 |
| DE | 10319700 | 11/2004 |
| EP | 1061487 | 12/2000 |
| EP | 0951697 | 12/2002 |

OTHER PUBLICATIONS

Fürstenberg, K., et al.; "Fahrzeugumfelderfassung mit mehrzeiligen Laserscannern," XP-002328784, Technisches Messen 71 (2004) 3; pp. 164-172.

* cited by examiner

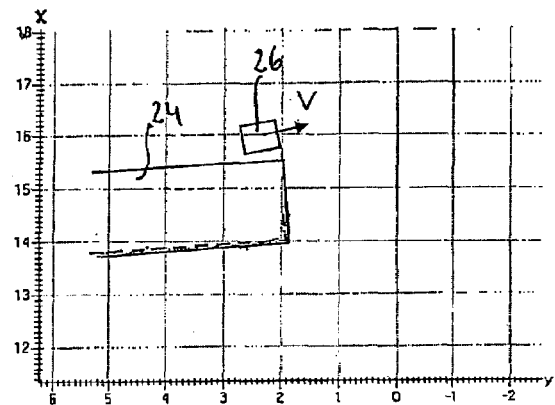 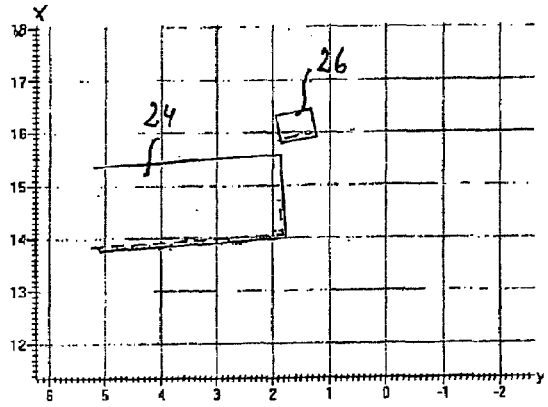
Fig. 3A                                          Fig. 3B
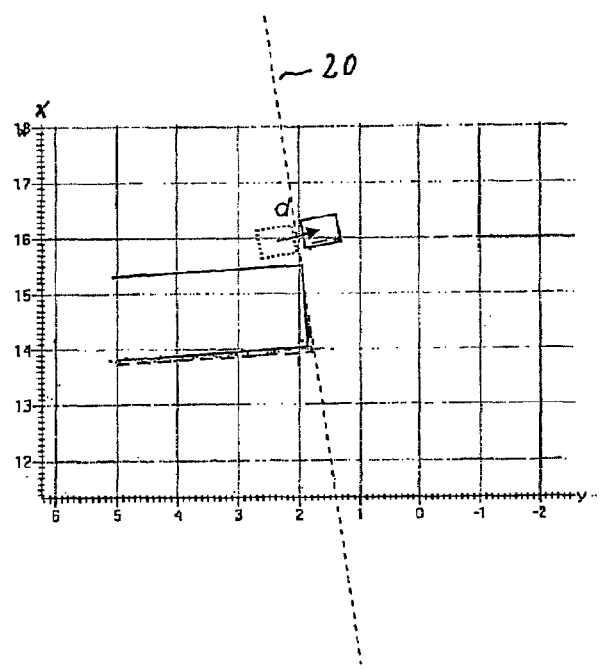
Fig. 4

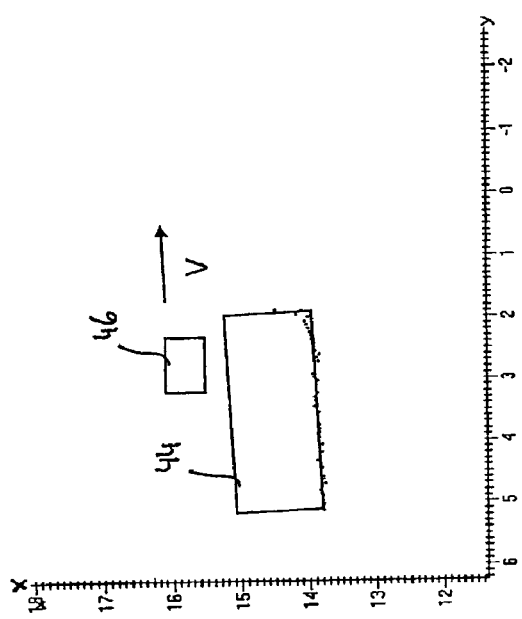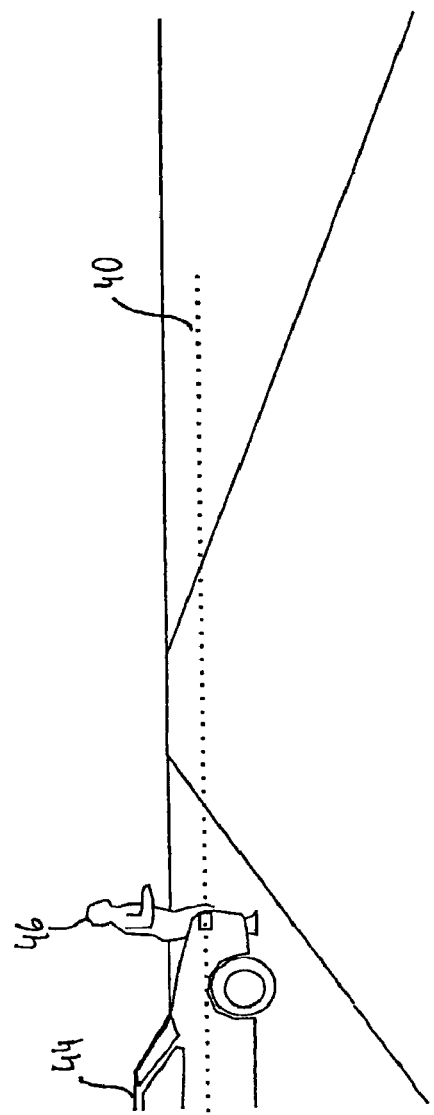

ated by
METHOD OF RECOGNIZING AND/OR TRACKING OBJECTS

CROSS-REFERENCE TO RELATED APPLICATIONS

This application claims the benefit of German Application No. 102004018813.0 filed Apr. 19, 2004. The disclosure of the above application is incorporated herein by reference.

FIELD OF THE INVENTION

The present invention relates to a method of recognizing and/or tracking objects which correspond to real objects in a sensing zone of a sensor for electromagnetic radiation and to an apparatus to carry out the method.

BACKGROUND OF THE INVENTION

Methods of recognizing and/or tracking objects are generally known. Typically, images of a sensing zone are sensed at constant time intervals by a sensor for electromagnetic radiation, for example by a laser scanner or by a video camera. The images are then searched for objects which correspond to real objects in the sensing zone. If an object was found in an image for the first time, a search is made for this object in subsequent cycles of the process to be able to track its position or its change of position over the course of time. For this purpose, starting from the position and speed of an object in a preceding cycle, its position is frequently predicted for a current cycle or in a current image to then be able to associate elements, for example segments, found in the proximity of the predicted position of the object in the image to the object from the preceding cycle and so to be able to sense its current position.

Such methods are, for example, suitable for the monitoring of a zone in front of and/or next to a motor vehicle. A possible advantage of such a monitoring can consist of the fact that suddenly occurring dangers can be automatically recognized and corresponding counter-measures can be initiated. However, it is necessary for this purpose for objects to be able to be recognized very fast and to be able to be tracked precisely.

With the aforesaid method, as the duration of the tracking of an object increases, the precision of the sensed object properties will frequently increase since, in the course of the tracking, further information can be collected on the object which permits a better characterization of the object or of the state of the object. Accordingly, irregularities can in particular occur when new objects occur in images. In the example of the motor vehicle, this can, for example, be a case of pedestrians who, masked by another real object such as a motor vehicle parked at the side of the road, suddenly step into the road and are only then able to be sensed by the sensor. The same problem can occur when pedestrians are positioned in front of a real object such that the object tracking process combines the pedestrian and the real object to form one object so that the pedestrian is also only recognized when he has moved sufficiently far away from the real object.

SUMMARY OF THE INVENTION

It is therefore the underlying object of the present invention to provide a method of recognizing and/or tracking objects which correspond to real objects in a sensing zone of a sensor for electromagnetic radiation which permits a fast recognition and tracking of objects and to provide a corresponding apparatus to carry out the method.

The object is satisfied by a method having the features of claim 1.

In the method in accordance with the invention of recognizing and/or tracking objects which correspond to real objects in at least one sensing zone of at least one sensor for electromagnetic radiation on the basis of images of the sensing zone repeatedly sensed by means of the sensor, successive images are evaluated in successive cycles and a search is made for at least one respective object found in a cycle on the basis of a corresponding image in a correspondingly later image in a later cycle to track the object. At least one part of an earlier image and/or at least one indication with respect to an earlier state of the object or of a real object corresponding to it, which was determined using a corresponding earlier image in the current cycle, is associated with at least one part of a current image determined in the current cycle or with an object recognized in the current cycle on the basis of the results of an at least preliminary evaluation of a current image during at least one current cycle.

The object is furthermore satisfied by an apparatus having the features of claim 11.

The apparatus in accordance with the invention for recognizing and tracking objects has at least one sensor for electromagnetic radiation designed to sense images of a sensing zone and one data processing device which is connected to the sensor, is made to carry out the method in accordance with the invention and in particular includes means for the evaluation of current images of the sensor, means for the determination of parts of a current image as a result of an at least preliminary evaluation of the current image or for the recognition of an object in the current cycle and means for the association of parts of an earlier image and/or for the determination of at least one indication with respect to an earlier state of the object or of a real object corresponding to it while using a corresponding early image in the current cycle and for the association of the indication with the part of the current image or with the current object.

The method in accordance with the invention, which can be carried out by means of the apparatus in accordance with the invention, serves for the recognition and/or tracking of objects in a sensing zone. This can generally be stationary or can move, which can in particular be the case when the images are sensed by means of a sensor attached to a vehicle.

The images are sensed by at least one sensor for electromagnetic radiation. The sensor can be a purely passive sensor which only receives electromagnetic radiation. A sensor can, however, also be used which has a source for electromagnetic radiation which can be radiated, in particular radiated in a directed manner, which can be reflected back by a point or region on a real object illuminated by the radiation and which has at least one corresponding sensor element sensitive to radiation reflected back from a point or region of a real object. Furthermore, combinations of sensors for electromagnetic radiation can also be used which sense different types of images. The sensing zones of the sensors then do not necessarily have to overlap, but it is preferred for them to overlap at least partly.

In this context, an image is in particular also understood as a set of data which each reproduce the position of a point or of a region on one or more real objects sensed by the sensor in at least one direction transverse to a direction of view of the sensor and at least one property of the point or of the region of the real object. The position of the real object point can, for example, be given in the sensing of object points in a scan plane by an angle with respect to any desired, but fixedly pre-set reference direction, for example of the sensor. On the sensing of real object points or regions in space, the positions can be given by positions of sensor elements of the sensor and, optionally, by imaging properties. The property can, for example, be the intensity and/or wavelength or color of the radiated optical radiation, the distance from the sensor or also the speed in the radial direction relative to the sensor. Video images can thus, for example, contain data on the intensity of radiated optical radiation as a property and with respect to a sensor element which has sensed the radiation of a point or region of a real object, and thus with respect to a position, whereas distance images can contain the distance from the sensor as properties of the sensed points or regions of the real object and an angle under which the point or region of the real object was sensed as the positional information. Finally, speed images contain data on the speed of the points or regions of the real object relative to the sensor.

The images do no have to be sensed directly by an individual sensor. It is rather also possible to combine two images which have been associated with one another in time and which were sensed by at least two sensors for electromagnetic radiation to form one total image which reproduces a larger sensing zone or additional properties or points or regions of real objects. For example, distance images can be generated from two images which were sensed by two video cameras arranged spaced apart with respect to one another while taking account of the imaging properties and of the arrangement of the video cameras and which, in addition to a distance of a point or region of a real object from a reference point stationary relative to the video cameras, also have data with respect to the intensity or color of the light radiated by the respective point or region of the real object.

Different types of images can furthermore also be combined to a total image or can be processed together or also in dependence on one another. For instance, video images and distance images can preferably be processed together without being combined to form a set of image data in a narrower sense.

The images used in the method in accordance with the invention are sensed at successive times, with them preferably having a constant time interval from one another. The sensor of the apparatus in accordance with the invention is therefore designed for the repeated sensing of images of the sensing zone. If a plurality of images are used for one cycle, they are preferably sensed substantially synchronously, i.e. their sensing times differ by a smaller space of time than that between successive scans by the sensor with the lowest sensing rate.

The sensed images are then evaluated in successive cycles, with at least one corresponding image being evaluated in a given cycle. If a plurality of images are sensed substantially synchronously, it is sufficient for one of the images to be evaluated at least in a preliminary manner.

A search is made in a corresponding later image in a later cycle for at least one respective object found in a cycle on the basis of at least one corresponding image in order to track it. For this purpose, conventional object recognition and tracking processes can in particular be used. In this case, an association of picture elements of the current cycle to objects recognized in a preceding cycle or image can take place.

A prediction process can in particular be used in which a position in the current cycle is predicted on the basis of the position of at least one object in an earlier cycle, in particular in a preceding cycle, and on the basis of its speed, and in which a search is made for the object in the environment of the predicted position. New objects can be formed from parts of an image, i.e. from picture elements or from sets of picture elements, in particular segments, determined in the cycle which were not able to be associated with already known objects.

In accordance with the invention and different to conventional object recognition and tracking processes, provision is now made for at least one part of an earlier image and/or at least one indication with respect to an earlier state of the object or of a real object corresponding to it, which is determined on the basis of a corresponding earlier image to be associated with at least one part of a current image determined in the current cycle or with an object recognized in the current cycle during at least one current cycle on the basis of the results of an at least preliminary evaluation of a current image.

If, in this process, a plurality of images of the same type or of a different type sensed substantially synchronously are used, it is sufficient for a preliminary evaluation of one of these images to take place; the association can take place with parts of the same image or of a different image sensed substantially synchronously.

This means that not only a current image is evaluated in a current cycle. It is rather the case that first the at least preliminary evaluation or, optionally part evaluation, of a current image in the current cycle is carried out. On the basis of this at least preliminary evaluation, i.e. in particular in dependence on the result of the at least preliminary evaluation, an earlier image is then used for the object tracking or for the determination of data with respect to an object, said image in particular being able to be an image which is sensed directly before the current image and is associated with a preceding cycle.

In the preliminary evaluation, in particular at least one criterion can be checked with reference to which a decision is made as to whether an earlier image should be used or not. This then means that an otherwise known object recognition and tracking can take place when the criterion is not satisfied.

In the at least preliminary evaluation, part of a current image is determined which can be a picture element or a set of picture elements, for example at least one segment, determined in the current cycle. If a plurality of current images are used in a current cycle, the image that was evaluated in a preliminary manner does not necessarily have to coincide with the image of which a part is determined. However, an object in the current image can also be recognized and used. Both the determination of the part of the image and the recognition of the object can first take place using process steps which are similar to those in conventional processes.

A part of the earlier image can then be associated with the part of the current image determined in the at least preliminary evaluation or with the object in the current cycle, said earlier image in turn being able to be a picture element or a set of picture elements, for example at least a segment, of the earlier image determined in the current cycle. In this process, the parts of the images can each have different numbers of picture elements so that no one-to-one association of picture elements has to be given. In this process, for any desired first and/or second objects and/or parts of first and/or second images, an association of a part of a first image or of a first object with a part of a second image or with a second object for any desired first and/or second objects and/or parts of first and/or second images is understood such that the part of the second image or the second object is pre-determined and, for this purpose, a suitable part of a first part or a suitable first object is selected and associated from, optionally, a plurality of alternatives.

However, an indication which relates to the object or to a real object corresponding to it can also be associated with the part of the current image or with the object in the current cycle. This indication can be values of any desired state parameters of an object or real object, for example the position, speed, size, association with one or more object classes into which the objects are ordered in accordance with their typical properties relevant to the object tracking, or even the presence of the real object as such. In this process, the total earlier image does not have to be used for the determination of the indication; the determination can rather also only be restricted to part regions. However, at least one picture element of the earlier image, which can preferably still be stored during the current cycle for this purpose, and simultaneously the result of the at least preliminary evaluation of the current image are always directly used for the determination.

In each case, it is important that a part of the earlier image or an indication gained from the earlier image are associated with a part of the current image or with an object of the current cycle, and not parts of the current image with objects or indications gained from the earlier image.

This means overall that, depending on the preliminary evaluation, information from a current image is used for a repeated and improved evaluation, at least a partly repeated evaluation, of the earlier image for the object tracking whose results are in turn used in the current cycle. Information contained in the images can hereby be evaluated better, which permits a faster and more precise object recognition and tracking.

The data determined by the process can then be output or stored to be used by downstream devices, for example to control a vehicle.

A data processing device is provided in the apparatus in accordance with the invention for the carrying out of the individual process steps which is connected to the sensor for electromagnetic radiation for the transmission of images. In this process, the data processing device can be made wholly or partly as a non-programmable circuit, which increases the speed of execution. The data processing device, however, preferably has a programmable processor for the carrying out of the method in accordance with the invention and, connected to it, a memory, an output interface and an input interface to the sensor.

Means for the evaluation of current images of the sensor, means for the determination of parts of a current image as the result of an at least preliminary evaluation of the current image or for the recognition of an object in the current cycle and/or for the association of parts of an earlier image or means for the determination of at least one indication with respect to an earlier state of the object or of a real object corresponding to it on the basis of a corresponding earlier image and association of the indication with the part of the current image or the current object can in particular be provided which can be formed in whole or in part as a non-freely programmable electric circuit, but can preferably be formed by a correspondingly programmed process.

Further developments and preferred embodiments of the invention are described in the description, in the drawings and in the claims.

A sensor for any desired electromagnetic radiation can be used as the sensor. In a preferred embodiment of the apparatus in accordance with the invention, at least a radar sensor, in particular a spatially resolving radar sensor, is used as the sensor. Accordingly, spatially resolved images of a radar sensor are preferably used in the method in accordance with the invention. Radar sensors can in particular directly sense radial speeds of real objects relative to the radar sensor.

However, at least one sensor for optical radiation, i.e. radiation in the infrared, visible or also ultraviolet range of the electromagnetic spectrum, is preferably used. Such sensors generally have a better spatial resolution than radar sensors.

Sensors for the sensing of distance images are particularly preferably used. A stereo video camera system can, for example be used comprising at least two video cameras which are arranged spaced apart in a plane in which a distance from the stereo video camera system is sensed. Sensors are, however, preferably used in which at least one scanning beam with electromagnetic radiation is used for the scanning of at least one scan plane. In this process, a plurality of scanning beams can be used for the substantially simultaneous scanning of strips in a scan plane or a scanning beam can preferably be pivoted in the scan plane, with radiation respectively reflected back by real objects being received by a corresponding detector. Corresponding laser scanners can in particular be used by means of which at least one pulsed laser radiation bundle can be pivoted over a sensing zone, radiation of the pulsed laser radiation bundle reflected back from a real object can be received and a distance of the real object can be determined with angular resolution with reference to the transit time of a pulse of the laser radiation bundle to the real object and back to the laser scanner. Such laser scanners are characterized by a good spatial resolution with a simultaneously high sensing rate. Laser scanners are particularly preferably used which scan a plurality of scan planes arranged above one another like a fan.

It is furthermore preferred for video images to be used in the method in accordance with the invention and for the apparatus in accordance with the invention for the sensing of video images to have a video system which can include at least one video camera which has an imaging optical system and a sensor system for the spatially resolved reception of optical radiation, for example of visible light and/or of infrared radiation. Depending on the application, a wide-angle camera or a panorama camera can in particular be used as the video camera. A video camera having a telephoto lens is particularly suitable for the monitoring of the distance zone. Generally, video cameras having zoom lenses can also be used. Furthermore, a black-and-white or gray-scale system, or also a color-sensitive system, can be used as the sensor system. Corresponding CCD or CMOS sensor elements can, for example, be used.

Furthermore, combinations of sensors for electromagnetic radiation can also be used which senses images of the same type or of different types. The sensing zones of the sensors in this process do not have to be identical; it is sufficient for them to overlap in the monitored zone.

To improve the object recognition and/or tracking in the current cycle, it is preferred for the association of the part of the earlier image or of the indication with respect to the earlier state of the object to be used for the determination of a further indication with respect to the current state of an object. The determined further indication does not have to relate to the object for which the indication with respect to its earlier state was determined. It can rather be any desired object of the current cycle. An at least sectionally recursively working process, so to say, thus results in which, starting from information from the at least preliminary evaluation of a current image, new information on an object or on a real object is first gained at a point in time corresponding to an earlier image and is in turn used for the evaluation of the current image. The information present in the images is thus utilized substantially more effectively than with processes working only in a linear manner.

It is in particular preferred for the treatment of newly recognized objects that, if a new object is recognized in a current cycle, a current position of the new object in the actual cycle is determined, that an earlier position of the new object in an earlier cycle is estimated on the basis of the current position of the new object and that, using the estimated earlier position of the new object, the current value of a state parameter of the new object in the current cycle is determined. The speed of the object, which can otherwise not be determined on the basis of only one image, can in particular be estimated as the state parameter.

A plurality of reasons can apply for the case that an object was initially not recognized in the earlier cycle. In a further development of the method in accordance with the invention, it is therefore preferred for a check to be made on the basis of the current position of the new object in the current cycle and of an earlier position of at least one other object in an earlier cycle whether the real object corresponding to the new object in the image evaluated in the earlier cycle could be masked by a real object corresponding to the other object in the earlier cycle. Masking is understood to mean that real object points of the masked real object were not able to be sensed by the sensor used, since regions of the other real object were arranged in the propagation path of the electromagnet radiation from the real object points to the sensor. This further development, on the one hand, facilitates the recognition of masking in the preceding cycle and permits an estimate of the position of a real object corresponding to the new object at the time of the earlier image by estimating the size and position of the masked portion of the sensing zone.

It is particularly preferred for a current size and/or shape to be determined for the new object in the current cycle and for the current size and/or form to be used in the check for masking. It can, for example, hereby be ensured that a masking is only recognized when a silhouette which can be sensed by the sensor or an outline of the new object or of the corresponding real object which can be sensed by the sensor is smaller from the viewpoint of the sensor than the corresponding outline or the corresponding silhouette of the other real object. The size and/or the shape of the new object can moreover serve to classify it initially into one of a plurality of object classes which each include real objects with properties characteristic for the object recognition and tracking. For example, object classes can be provided for pedestrians, motor vehicles, road boundaries or similar. An estimate can then be made in dependence on the object classes as to whether the real object could have moved from a region masked by the other real object into the sensed position at the maximum speed possible for real objects of the respective object class in the time present between the sensing of the current image and of the earlier image.

It can therefore be found by the masking check from the information gained by the evaluation of the current image in the current cycle that a new object is present in the sensing zone whether a real object corresponding to this new object was already present in the sensing zone of the sensor at a preceding time. It is in particular preferred in this case that, when a masking is assumed from the current position and preferably from the current size and/or shape of the object corresponding to the real object causing the masking, an earlier position of the real object corresponding to the new object in the earlier cycle is estimated and a current speed of the new object is estimated from this. The information on the new object in the earlier cycle gained in the current cycle can therefore be used to estimate its speed as a state parameter in the current cycle both with respect to the direction and to the magnitude. This is particularly helpful, for example, for the fast recognition of pedestrians masked by parking cars who suddenly move out from behind the vehicle and also for an optional reaction to this.

An object newly recognized in a current image can, however, also not have been recognized as a masking in the earlier cycle for another reason. It is, for instance, preferred for a search for the new object to be made in an earlier image and, if the object is found in the earlier image, for a current value of at least one state parameter for the object and/or for another object to be determined while using an earlier value of the state parameter for the new object and/or for the other object in the earlier cycle. The search can be facilitated, on the one hand, in that properties of the object, for example its size and/or outline or shape, are already known from the current cycle. On the other hand, the fact can be used that the new object must have been present in the earlier image so that, on the evaluation of the earlier image in the earlier cycle, any present uncertainties can optionally be eliminated on the association of parts of an image, for example, picture elements or segments, with objects.

Such an uncertainty can in particular occur when two real object points or regions actually belonging to two different real objects are recognized as belonging to one object in the earlier image. If the new object is again found in the earlier image, information can thus be gained both on the new object or on the one real object corresponding to it and on another object corresponding to the other real object and now newly determined for the earlier cycle. The positions and, optionally, sizes and/or shapes of the new object or of the other object can in particular be determined as the state parameter in the earlier cycle for the new object or for the other object. Using corresponding data for the current cycle, a speed can then already be determined, on the one hand, for the object initially new in the current cycle and a more precise speed can be determined, on the other hand, for the other object which corresponds to the other real object in the preceding cycle.

By using the method of the invention in accordance with this further development, pedestrians can in particular be very simply recognized, for example, who have been standing directly in front of a real object at the side of the road in the view of the sensor and who have then stepped into the road. Directly on recognition of the pedestrian in a current image, his speed can then be estimated both with respect to its magnitude and its direction by the temporal back-tracking so that valuable time can be gained on the recognition of the pedestrian.

The search for the new object in the earlier image can take place in different manners. It is preferred in a further development of the method in accordance with the invention for the images to be segmented using a pre-determined segmentation process and using at least one corresponding pre-determined segmentation parameter and for at least one corresponding region of the earlier image to be segmented again using a different segmentation process and/or using a changed segmentation parameter for the location of the new object in the earlier image. Consequently, a new association of the newly determined segments with corresponding objects can take place. The new segmentation does not have to take place for the whole image, but can rather preferably only cover the region determined by the position of the new object in the current cycle and of corresponding closer other objects in dependence on the speed so that the recognition of other objects is not impaired. Both the segmentation process used and the optionally changed segmentation parameters can in particular be adapted in dependence on the situation, i.e. can be selected in dependence on the positions, types or sizes and/or also on the number of the corresponding picture elements of the new object and of the respective other object.

In a preferred further development of the method in accordance with the invention, distance images and video images associated with one another in time are used which can be sensed, for example, by a laser scanner for the sensing of distance images and by a video camera for the sensing of video images or also by a video system for the generation of stereo images and having at least two video cameras which are arranged spaced apart from one another and are coupled to one another. If, for example, the video image processing is controlled by an evaluation of corresponding distance images in order to reduce the processing effort, i.e. if an attention control of the video image process by the laser scanner takes place, are search for features and/or objects only takes place in those regions of the video image which include sections in which picture elements corresponding to points or regions of a real object were detected in the corresponding distance image. The regions can in particular be formed by strips extending in a direction orthogonal to a scan plane whose intersection with the sensing zone of the sensor is defined in its position and width by at least one distance picture element or by a plurality of distance picture elements for the sensing of the distance images. A real object is only detected in the video image when it enters into the sensing zone of the sensor for the sensing of the distance images. If, for example, a laser scanner is used for the sensing of the distance images which scans a plane of the sensing zone by means of a laser beam pivoted in a scan plane, a real object can be recognized in a video image even though it is not yet recognizable in the distance image, for example as a consequence of masking at the level of the scan plane.

It is therefore preferred for distance images and video images of at least one common part region of the sensing zone associated with one another in time to be used, for a search to be made in video images for objects and/or features only in part sections which are determined in dependence on distance picture elements associated in time, for the new object and/or feature in the video image to be back tracked in time to an earlier cycle in a current cycle on recognition of a new object and/or feature and for a position of the real object corresponding to the new object and/or to the feature in the earlier cycle to be determined using the information on an object and/or feature corresponding to the real object in the earlier video image. The used distance images and video image associated with one another in time are preferably sensed substantially synchronously, i.e. their sensing times differ by a smaller space of time than that between successive scans by the sensor with the lowest sensing rate. The part sections can in particular be given by regions of predetermined shape and size about the distance picture elements, preferably by the previously mentioned strips orthogonal to a scan plane. For distance picture elements in the distance image, a search can therefore be made for at least one corresponding feature or for a whole object in the video image in the corresponding part section of the video image. When only features are used, the back tracking can be carried out faster as a rule. The determination of the position of the real object corresponding to the new object or to the feature in the earlier cycle can in particular take place by an estimate which is preferably based on the position of the corresponding feature and/or object in the video image. Furthermore, the speed of the new object or feature in the current cycle can be determined from the position of the real object corresponding to the new object or feature in the earlier cycle and from the position of the new object or feature in the current cycle. In this method variant, the fact can in particular be utilized that real objects can frequently already be recognized using a video camera when they are not yet recognizable in the distance images, which reproduce the sensing zone usually of a lesser vertical extent, i.e. flatter, for example due to masking at the vertical in the sensing zone of the sensor for the distance images. If a real object occurs in the distance image for the first time, it is thus possible to recognize a feature in the preceding cycle corresponding to it in the video image when the real object was only masked in the distance image, but not in the video image. A speed of the real object can then be determined on the basis of the position of the feature in the video images. The occurrence of "blind spots" in the video image processing, which are caused by the attention control, can thus be restricted without substantial effort.

In another embodiment of the method in accordance with the invention, it is preferred for distance images and video images of at least one common part region of the sensing zone associated with one another in time to be used, for distance picture elements in a current distance image to be associated with distance picture elements in an earlier distance image in that a displacement and/or a displacement speed, in particular an optical flow, is determined for at least one region corresponding to a distance picture element in the earlier distance image and/or for at least one feature of the corresponding earlier video image and/or of the current video image corresponding to a distance picture element in the earlier distance image and for the displacement or the displacement speed, in particular the optical flow, to be used for the association of a distance picture element in the current distance image with the distance picture element in the earlier distance image, with distance picture elements in the preceding cycle being associated with distance picture elements in the current cycle, when using the corresponding displacement or displacement speed of the region or of the feature, in particular of the corresponding optical flow, for objects in the distance image which approach the sensor sensing the distance images and/or have more distance picture elements in a current cycle than in an earlier cycle. In this embodiment, information from distance images is linked with information from corresponding video images, whereby data are additionally obtained on at least one distance picture element which can be used in the processing of the distance picture elements. The fact is in particular utilized that, on a movement of a real object, regions on the real object sensed in the distance image and in the video image are as a rule moved along with it. If the regions in the video image have an intensity development or corresponding features, the movement of the real object is expressed approximately as a displacement of the corresponding intensity courses or features in the video image. A displacement is understood as a displacement between successive cycles which, however, do not have follow one another directly. The movement information from the video images can then be associated with the corresponding regions of the real object or with corresponding distance picture elements.

A corresponding optical flow is preferably determined for the determination of the displacement or of the displacement speed of the region. An image plane can be used in the surface used for the definition of the optical flow, on the one hand, in which the video picture elements of the video image then likewise defined in the plane lie. A surface is, however, preferably used which is used within the framework of a camera model for the treatment of a video image. It is generally sufficient for an optical flow to be able to be determined for at least one distance picture element. The case can namely generally occur that distance picture elements on real object surfaces are sensed which have no intensity structure and for which therefore also no optical flow can be determined. The optical flow can, for example, be completely determined when the corresponding region of the video image has a change of intensity in two directions linearly independent of one another. A corresponding tracking therefore preferably takes place with reference to these regions.

Methods of calculating the optical flow are generally known and are described, for example, in the article "The computation of optical flow" by J. L. Barren und S. S. Beauchemin in ACM Computing Survey, Vol. 27, No. 3, pages 433-467 (1995) and in the article "Performance of optical flow techniques" by J. L. Barren, D. J. Flied, D. J. and S. S. Beauchemin in the International Journal of Computervision, 12 (1), pages 43-77 (1994) whose contents are herewith included in the description by reference.

The optical flow does not necessarily have to be calculated for the whole video image. It is rather sufficient to determine it for the real object point corresponding to the distance picture element or—where necessary—for its surroundings. The point in the surface used for the definition of the optical flow for which the optical flow has to be calculated can be derived from the position coordinates of the distance picture element, from the relative position of the sensor used for the sensing of the distance images with respect to the video system used for the sensing of the video images, of the imaging geometry of the video system or of a video camera therein or of a model for this surface and the pre-determined surface on which the optical flow should be determined. A corresponding video picture element can be used as the point; however, it is also possible to determine the optical flow precisely to the sub-pixel at points between video picture elements or pixels of the video image. The tracking of distance picture elements with the aid of the optical flow, wherein distance picture elements in a later cycle are associated with distance picture elements in an earlier cycle, is described in the German patent application filed by the applicant with the official file reference 103 12 249.4 whose content is herewith included in the description by reference. Distance images are called depth-resolved images there.

This method used for objects moving away from the sensor or for objects with a no larger number of distance picture elements in the current cycle therefore has the advantage that a prediction of the object positions does not have to take place, since the use of the displacement or of the optical flow permits a tracking of individual distance picture elements. The reversed procedure with approaching objects or objects which have more distance picture elements in the current cycle than in an earlier cycle has the advantage, on the one hand, that an association of a larger number of distance picture elements with a lower number of distance picture elements can take place correctly with greater safety, in particular in situations in which objects in the current cycle are closely adjacent to one another. On the other hand, a more precise speed can be associated with the corresponding object since, for the determination of the speed of the object, an averaging over corresponding speeds of distance picture elements associated with one another can be used and a larger number of such distance picture elements is available in the current cycle.

In another further development of the method in accordance with the invention, it is preferred for the object recognition and tracking to take place on the basis of video images and for the detection of objects to take place on the basis of filtered video images for the object recognition, said video images having a reduced resolution due to the filtering, and for a search to be made after detection of an object in the current cycle on the basis of the position and, optionally, the shape of the object in the currently filtered video image, for a real object in an earlier video image corresponding to the object, the resolution of said later image being higher than that of the filtered video image and for corresponding data on the object to be used in the evaluation of the current video image on the finding of a corresponding object in the earlier video image. The object recognition and tracking can, optionally, be supported by the use of distance images. In this further development, initially sensed video images are subjected to a filtering to reduce the resolution, primarily to save computation effort. The filtering can be any desired method in which the number of picture elements of the video image is reduced. In the simplest case, for example, simply only a sub-scan of the image can be carried out in which only one respective picture element or pixel from square blocks of picture elements or pixels is used as representative for the whole arrangement. If a far distant object approaches the sensor used to sense the video image, the case can occur that, on the first detection of the object, only very few picture elements or pixels are available in the filtered video image. By analysis of the earlier image with increased resolution, the object, which was only not recognizable in the earlier image due to the filtering, can now, optionally, be recognized so that a trajectory and speed can be associated with the newly recognized object in the current cycle despite the only low resolution, without a substantial computation effort being required for this purpose.

A subject of the invention is also a computer program with programming code means to carry out the method in accordance with the invention when the program is installed on a computer.

A further subject of the invention is also a computer program product with programming code means which are stored on a computer-legible data carrier to carry out the method in accordance with the invention when the computer program product is installed on a computer.

A computer is understood here as any desired data processing apparatus, in particular a data processing device of the apparatus in accordance with the invention with which the method can be carried out. This can in particular have a digital signal processor and/or microprocessor with which the method is carried out as a whole or in parts.

The invention is preferably suited for the monitoring of regions with moving real objects, in particular road traffic, with the sensing of the images being able to take place by at least one stationary sensor and/or by a sensor held at a vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 3A and 3B show sections of distance images of a sensing zone of a laser scanner of the apparatus in FIG. 1 sensed at successive points in time with a vehicle shown only in part and a moving pedestrian;

FIG. 4 shows the representation in FIG. 3B with additional auxiliary lines for the explanation of a computation of the position or speed of the pedestrian;

FIGS. 10A and 10B show sections from a distance image and from a corresponding video image with a vehicle and a moving pedestrian at a first sensing time point;

DETAILED DESCRIPTION OF THE PREFERRED EMBODIMENTS

The following description of the preferred embodiment(s) is merely exemplary in nature and is in no way intended to limit the invention, its application, or uses.

Figure 1:
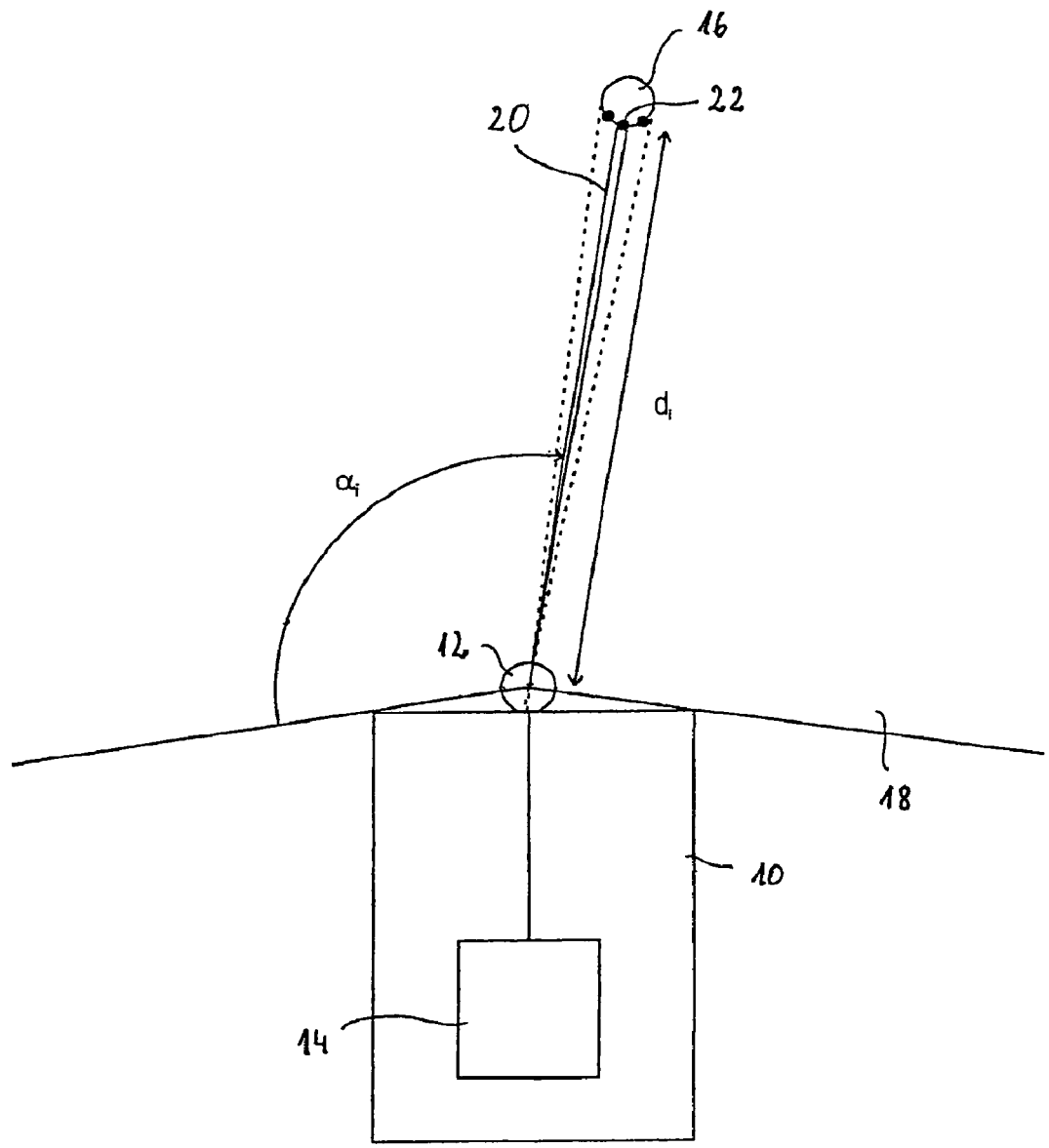
FIG. 1 shows a schematic plan view of a vehicle having an apparatus for the recognition and tracking of objects in accordance with a first preferred embodiment of the invention and of a real object located in front of the vehicle.

In FIG. 1, a vehicle 10 carries a laser scanner 12 at its front side as well as a data processing device 14 which is connected to the laser scanner 12 via a data line and which, together with the laser scanner 12, forms an apparatus for the recognition and/or tracking of objects in accordance with a first preferred embodiment of the invention. A person 16, shown only very schematically in FIG. 1 is located in front of the vehicle in the direction of travel and is considered as a real object within the framework of the invention for reasons of simplicity.

A sensing region 18 can be scanned by means of the scanner 12, is only partly shown in FIG. 1, is arranged symmetrically to the longitudinal axis of the vehicle 10 due to the installation position of the laser scanner 12 at the front side of the vehicle 10 and covers an angle of somewhat more than 180°. The sensing zone 18 is only shown schematically in FIG. 1 and in particular too small in the radial direction for the better representation.

The laser scanner 12 scans its sensing zone 18 in a generally known manner with a pulsed laser radiation bundle 20 rotated at a constant angular speed, with it being detected, likewise in a rotating manner, at constant time intervals $\Delta t$ at times $\tau_i$ at fixed angular ranges about a mean angle $\alpha_i$ whether the laser radiation bundle 20 is reflected by a point 22 or by a region of a real object, for example of the person 16 The index i runs from 1 up to the number of the angular ranges in the sensing zone 18. Only one angular range from these angular ranges is shown in FIG. 1 and is associated with the mean angle $\alpha_i$. The angular range is, however, shown exaggeratedly large here for a clearer representation.

Due to the pivoting of the laser radiation bundle 20, the sensing region 18 is substantially two-dimensional with the exception of the expansion of the laser radiation bundle 20 and substantially, i.e. with the exception of the diameter of the laser radiation bundle 20, forms one scan plane.

The spacing $d_i$ of the real object point 22 from the laser scanner 12 is determined with reference to the transit time of a laser radiation pulse transmitted by the laser scanner 12 from the laser scanner 12 to the real object point 22 and back to the laser scanner 12. The laser scanner 12 therefore senses the angle $\alpha_i$ and the spacing $d_i$ determined at this angle, i.e. the position of the real object point 22 in polar coordinates, as coordinates in a distance picture element corresponding to the real object point 22 of the real object or of the person 16. A distance picture element is therefore associated with each sensed real object point.

The set of the distance picture elements sensed in the one scan forms a distance image within the sense of the present application.

The laser scanner 12 respectively scans the sensing zone 18 in successive scans at time intervals $\Delta t$ so that a time sequence of scans and corresponding distance images is created. The processing of the distance images of the laser scanner 12 takes place by the data processing device 14.

The data processing device 14 has inter alia for this purpose a digital signal processor programmed with a corresponding computer program in accordance with the invention for the execution of the method in accordance with the invention and a memory device connected to the digital signal processor. In another embodiment of the apparatus in accordance with the invention, the data processing device can also have a conventional processor with which a computer program in accordance with the invention stored in the data processing device is installed for the execution of the method in accordance with the invention.

The programmed data processing device represents in the sense of the invention means for the evaluation of current images of the sensor, means for the determination of parts of a current image as the result of an at least preliminary evaluation of the current image or for the recognition of an object in the current cycle and means for the association of parts of an earlier image and/or for the determination of at least one indication with respect to an earlier state of the object or of a real object corresponding to in on the basis of a corresponding earlier image and for the association of the indication with the part of the current image or the current object.

Figure 2:
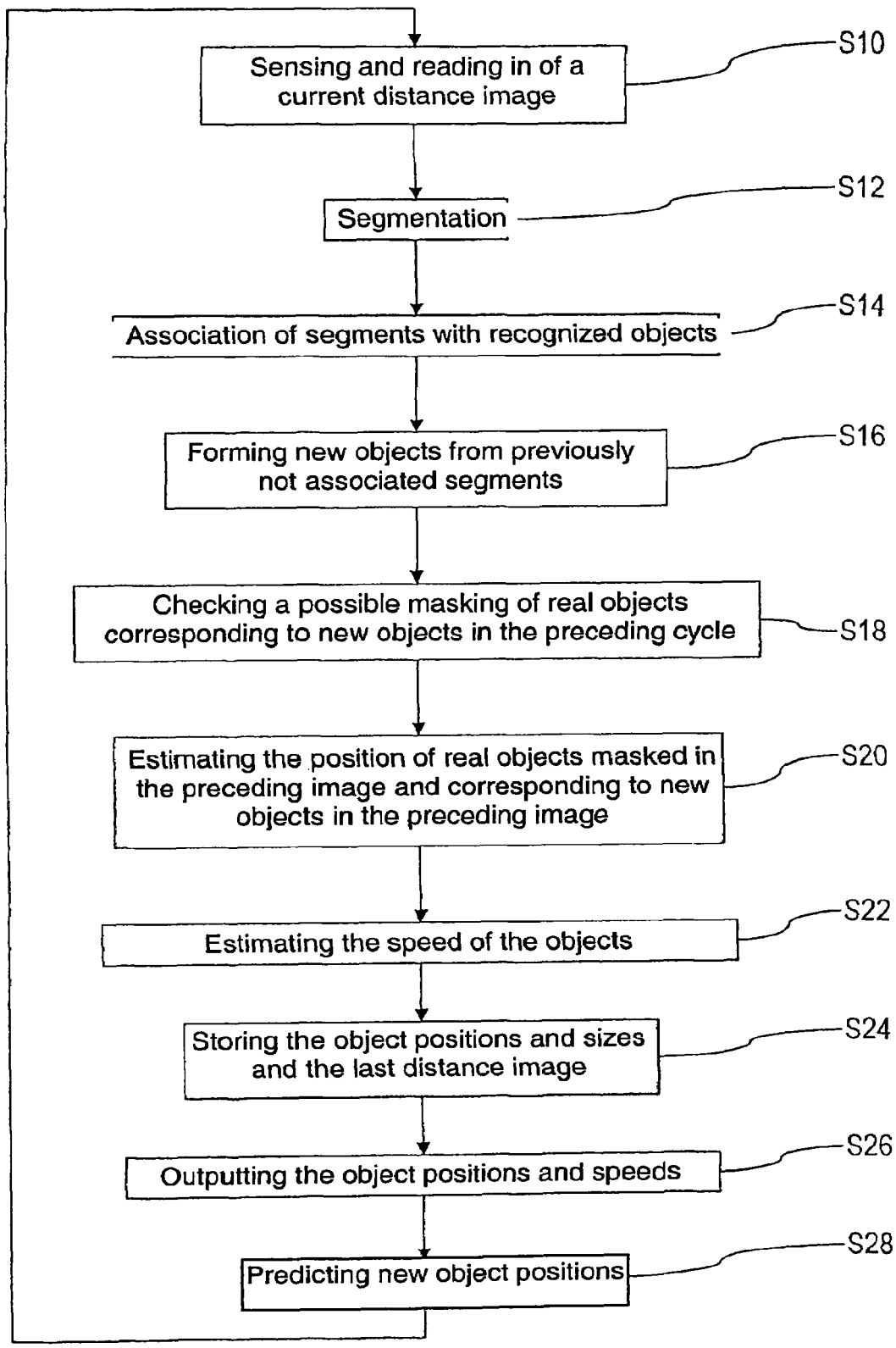
FIG. 2 shows a flowchart in which the procedure of a method in accordance with a first preferred embodiment of the invention is schematically illustrated.

The method in accordance with a first preferred embodiment of the invention illustrated in FIG. 2 is carried out on the basis of the distance images sensed by the laser scanner 12.

The steps S10 to S28 are each carried out in successive cycles.

First, in a current cycle, in step S10, a distance image is sensed by a scan of the sensing zone 18 and is read into a memory in the data processing device 14.

In step S10, a pre-processing of the distance image data is carried out in which, optionally after correction of the data, a transformation of the position coordinates of the distance picture elements into a Cartesian vehicle coordinate system fixedly associated with the vehicle 10 is carried out.

In step S12, the distance image is then segmented. Sets of distance picture elements are formed in a manner known per se which are characterized in that each distance picture element of a set of at least one other distance picture element of the same set has a mean square spacing which is smaller than a pre-determined segmentation spacing. A set formed in this manner respectively corresponds to a segment. A segment can also be formed by an individual distance picture element which has a mean square spacing from all other distance picture elements of the current distance image which is larger than the pre-determined segmentation spacing.

In step S14, which is not carried out in the very first cycle of the method, an association then takes place of segments with objects already recognized in an earlier cycle of the method, for which purpose methods known per se can be used. In the present method, for this purpose, a respective object position predicted in step S28 of the preceding cycle is used for each object known in the preceding cycle. In the current cycle, a segment of the current cycle is associated with a corresponding object of the preceding cycle when at least one of the distance picture elements of the segment in the predicted object position has a spacing from the object which is smaller than a maximum spacing dependent on an uncertainty of the prediction and of the size and orientation of the object in the preceding cycle.

In step S16, new objects are then formed from segments which were not able to be associated with any objects known from the preceding cycle and a position of the object in the current cycle is determined from the positions of the distance picture elements constituting the segments.

The previously described steps S10 to S16 and the steps S26 and S28 still to be described do not differ from conventional object recognition and tracking processes.

In contrast to these, however, in step S18, a check is made after a check of whether new objects were found as to whether, in the preceding cycle, a real object corresponding to a newly formed object in a preceding distance image or cycle could possibly have been covered by a real object corresponding to an object already recognized in the preceding cycle.

The processing of the current distance image in the steps S10 to S16, including the check in step S18 whether a new object was found, represents an at least preliminary evaluation of the current image.

A check is first made for the masking recognition in the preceding distance image of which objects recognized in the preceding image have a contour in it which is formed by a compensation curve through the corresponding distance picture elements and which is larger than the extent of the new object in the current cycle determined by the corresponding distance picture elements.

This is shown by way of example in FIGS. 3A and 3B in which—in sections of successive distance images—a vehicle 24 is shown which is only represented in part by the black solid line and a pedestrian is shown who is symbolized by a rectangle 26 and who is moving at a speed v with respect to the vehicle 24. The individual points reproduce distance picture elements of the corresponding distance images. In FIGS. 3A and 3B, the laser scanner 12 is located at the coordinate origin, i.e. at the point (0,0), with the coordinate axes of the Cartesian coordinate system being divided into any desired, but fixedly selected distance units.

In FIG. 3A, a preceding distance image, the pedestrian 26 is masked from the view of the laser scanner 12 by the vehicle 24 and can therefore not be sensed in the distance image. In FIG. 3B, in which the current distance image is shown, the pedestrian 24 has moved away from behind the vehicle 24 and can now be sensed by the laser scanner 12 for the first time. The contours of the objects corresponding to the real objects 24 or 26 are each given in FIGS. 3A and 3B by a compensation curve through the distance picture elements drawn as a broken line. It can easily be recognized that in FIG. 3B the contour of the object corresponding to the vehicle 24 is larger than the object corresponding to the pedestrian 26.

The further masking recognition preferably takes place in a situation-adapted manner, i.e. in dependence on the speeds of the already recognized objects in the preceding cycle. In the example in FIGS. 3A and 3B, it is known that the vehicle 24 is stationary and that, since no further object can be found in direct proximity to the newly recognized object corresponding to the pedestrian 26 or since no other object has a smaller spacing from it and the object corresponding to the pedestrian 26 can not correspond to a very fast moving real object due to the size, the real object or pedestrian 26 was masked by the vehicle 24 with a very high probability.

In step S20, the position of real objects masked in the preceding distance image and corresponding to new objects is estimated as an indication with respect to an earlier state of the respective new objects in the sense of the invention. To be able to estimate a minimum speed of the real object or of the pedestrian 26 in the example of FIGS. 3A and 3B, it is assumed for the estimate of the position in the preceding distance image in FIG. 3A that the real object or the pedestrian 26 was just not visible at the sensing time of the distance image so that the edge of an object box surrounding said real object or pedestrian in the current distance image whose size is pre-determined in the method for objects of the type pedestrian could just not be sensed by the rotating laser radiation bundle 20. In this manner, the estimated position of the pedestrian 26 in the preceding distance image or cycle which is given by the rectangle drawn by dots in FIG. 4 and which is displaced by the displacement vector d with respect to the position in the current distance image or cycle.

In step S22, the speed of the objects is then estimated in that the change of the position of an object in the preceding image and in the current image is determined, with the estimated position being used for the new objects, to the extent that they were masked. The estimated speed of the objects then results both with respect to the direction and to the magnitude of the speed by division of the position change given by the displacement vector d by the period of time Δt between successive scans of the sensing region 18.

Whereas only a low error is to be expected for speeds determined for objects already recognized in the preceding cycle due to the present measured data, only an estimate suffering from a larger error results for new objects. This estimate, however, communicates a great deal more information, and above all safety-relevant information faster than would be possible without recourse to the earlier image.

In step S24, the determined object positions and object sizes and the current distance image, which must be available in the following cycle as a then preceding distance image, are stored, with the preceding distance image being deleted.

In step S26, the object positions and the speeds are output to corresponding further-processing devices.

In step S28, a prediction of new object positions for the following cycle is carried out at the end of the current cycle. The prediction of the position of the object and also the determination of the uncertainty of the prediction can, for example, take place in a known manner by means of a Kalman filter.

Since a speed can already be associated with the new object or real object in the current cycle, the initialization of the Kalman filter for this object can take place with substantially more precise data, which substantially facilitates the following object recognition and tracking.

The next cycle can then start with step S10.

Figure 5:
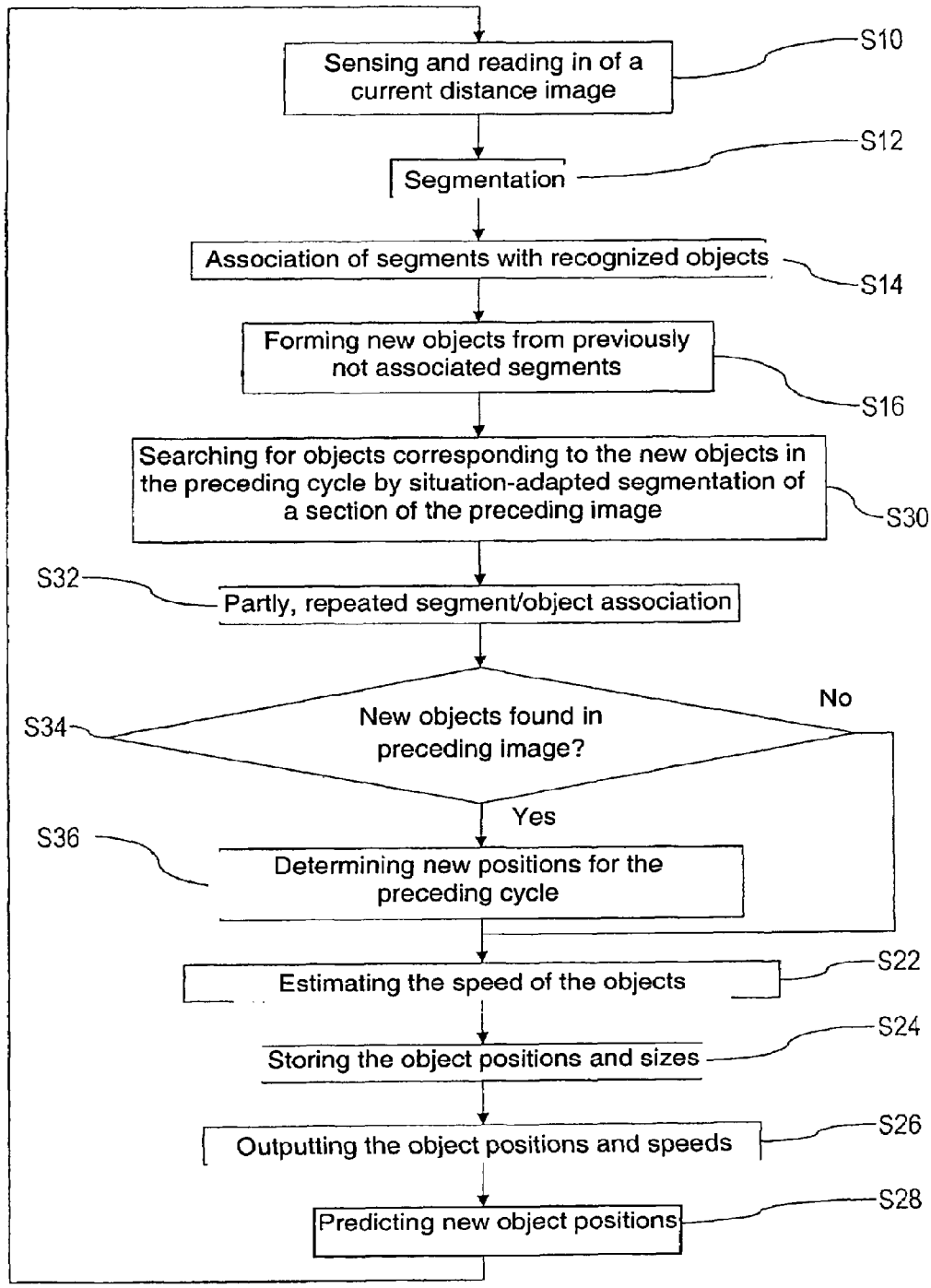
FIG. 5 shows a flowchart in which the procedure of a method in accordance with a second preferred embodiment of the invention is schematically illustrated.

A method of recognizing and tracking objects in accordance with a second preferred embodiment of the invention is shown schematically in the flowchart in FIG. 5. It differs from the method in accordance with the first embodiment in that objects newly recognized in a current cycle are treated differently so that the steps S10 to S16 and S22 to S28 are the same as in the previously described embodiment and the statements there also apply accordingly here. Accordingly, the apparatus for the tracking and recognition of objects using the method in accordance with the second preferred embodiment of the invention has only been changed with respect to the corresponding apparatus in the first embodiment in that the program run through in the data processing device 14 has been correspondingly modified, i.e. in particular in that the means for the association of parts of an earlier image and/or for the determination of at least one indication with respect to an earlier state of the object or of a real object corresponding to have been modified on the basis of a corresponding earlier image and an association of the indication with the part of the current image or the current object.

In the method, after the steps S10 to S16 running as in the first embodiment after the formation of new objects from previously non-associated segments in step S16, a search is made in step S30, after checking the criterion whether a new object was found at all in the current distance image, for objects or real objects in the preceding distance image corresponding to the new objects. It is assumed that the new object could not be found in the preceding cycle or distance image since it could not be recognized as an independent object due to the segmentation and objector formation or segment/object association.

One example for this is illustrated in FIGS. 6A to 6G in which respective sections from successive distance images are shown. The laser scanner 12 is in turn arranged at the origin (0,0) of the coordinate system in the distance images which corresponds to the Cartesian coordinate system of the preceding embodiment.

Figure 6A:
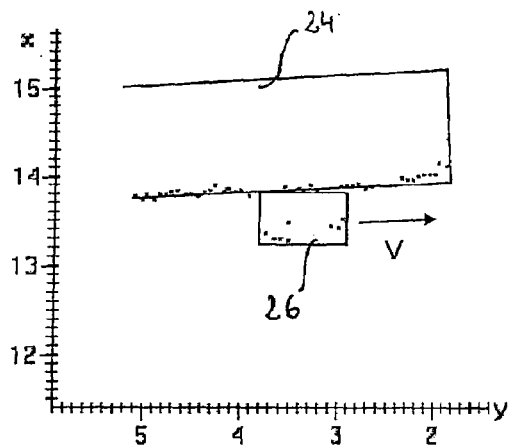
FIGS. 6A to 6G show sections of distance images sensed successively in time of scenes with a vehicle only shown partly and a moving pedestrian located in front of the vehicle at times.
Figure 6B:
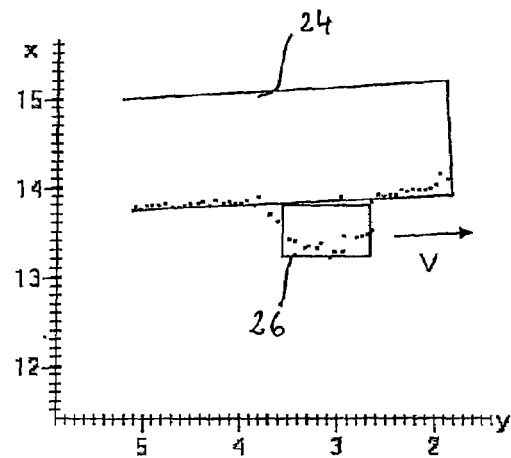
Figure 6C:
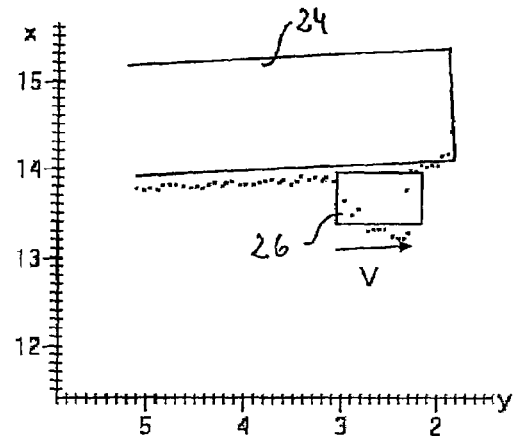
Figure 6D:
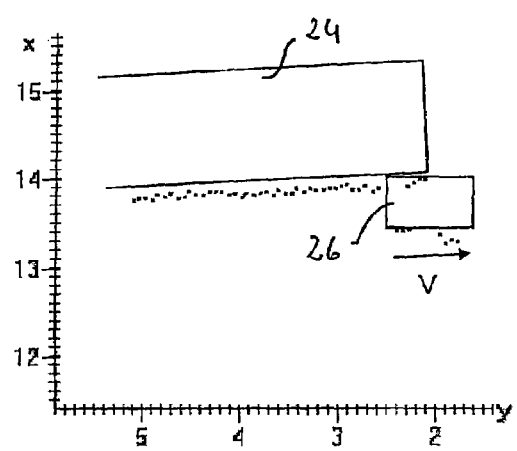
Figure 6E:
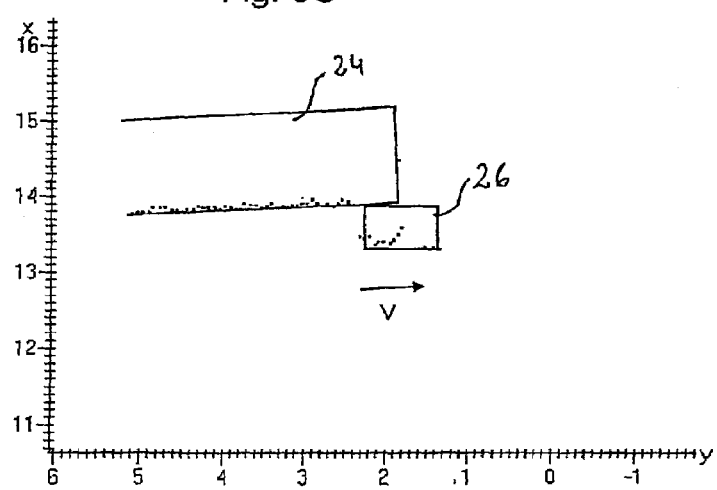
Figure 6F:
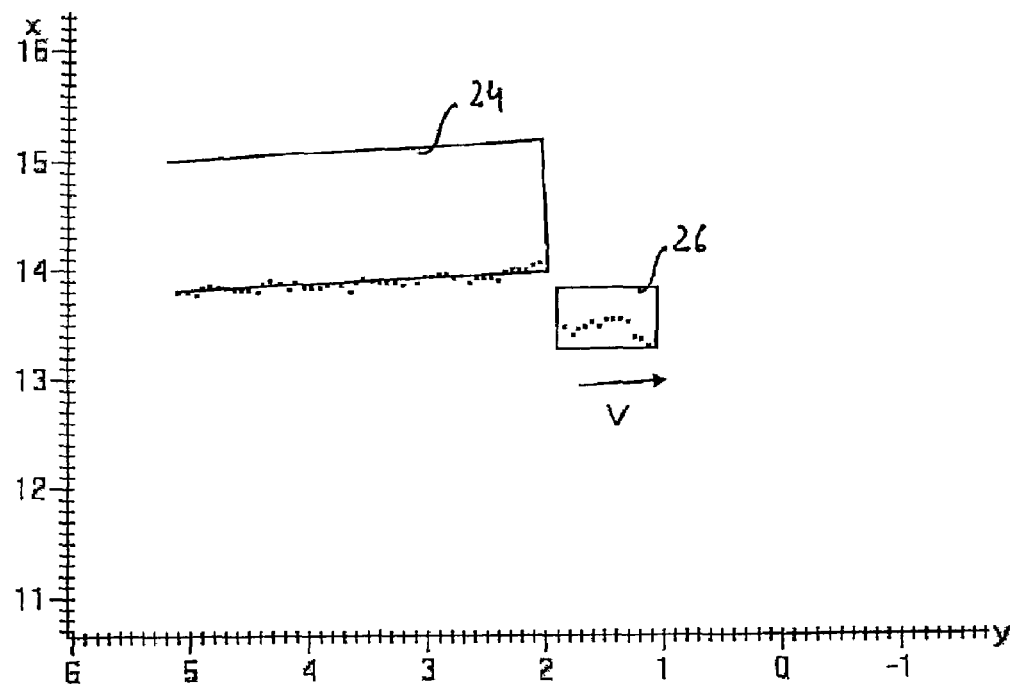
Figure 6G:
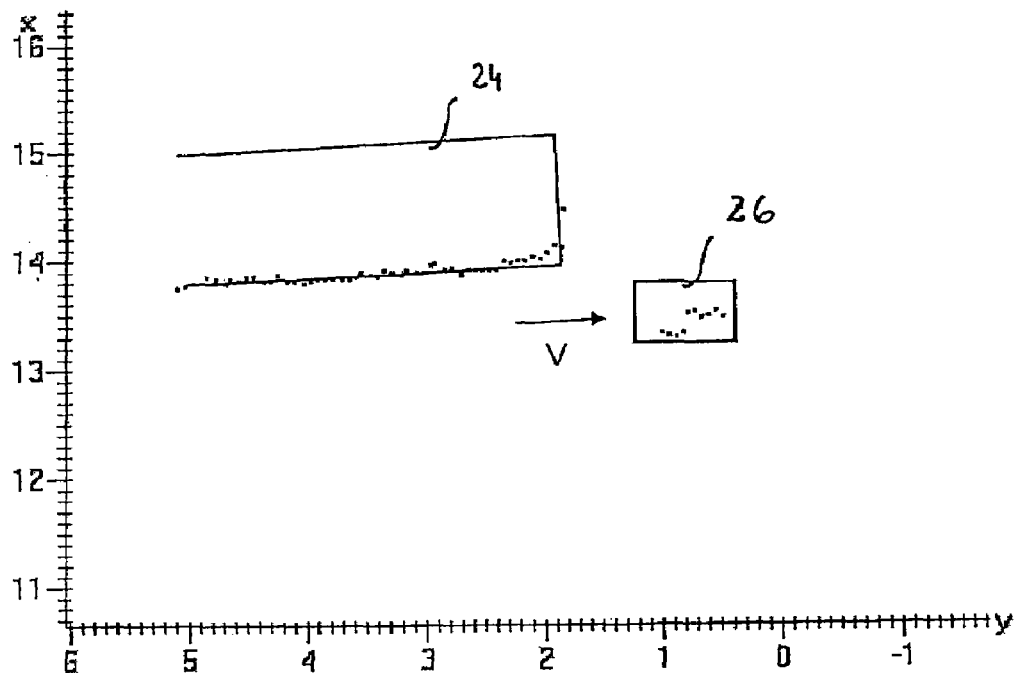

In the distance images, a pedestrian 26 is initially moving, from the view of the laser scanner 12, directly in front of a parking vehicle 24 at a speed v in order, in FIGS. 6F and 6G, ultimately, to move so far away from the vehicle 24 that he can be recognized as an independent object using the normal segmentation process. However, in the preceding distance images, the segmentation cannot separate the distance picture elements corresponding to the vehicle 24 from the distance picture elements corresponding to the pedestrian 26.

Starting from the size of the real object 26 or of the corresponding new object in the current cycle, in which the distance image in FIG. 6F is evaluated in the example, it is assumed that said real object can only have a low speed since the object must be a pedestrian. For the search in step S30, the objects are therefore determined for the new situation-adapted segmentation which are closest to the new object corresponding to the pedestrian 26 in the current cycle corresponding to the distance image in FIG. 6F. In the example, this is only the object corresponding to the vehicle 24. The steps up to this stage correspond to an at least preliminary evaluation of the current distance image in the sense of the invention.

A part of the preceding distance image is then newly segmented. More precisely, those distance picture elements of the segments in the preceding distance image or cycle are newly segmented, which form respective objects determined previously for new segmentation in the preceding cycles. In the example, these are all distance picture elements of the distance image in FIG. 6E.

For this purpose, in the preceding embodiment, the segmentation process used in step S12 is used, however with a reduced segmentation spacing. The segmentation spacing can be fixedly pre-set. The segmentation spacing is, however, preferably selected in dependence on the sensed size of at least one of the sensed objects, preferably the smallest, so that a situationally adapted segmentation can take place.

If a change in the number of segments results, a new association of segments with the objects affected by the renewed segmentation is carried out in step S32. For objects already known in the preceding cycle, their position and speed in the preceding cycle are used in conjunction with the orientation, shape and size determined in the current cycle and, for the new objects, its shape and size determined in the current cycle are used.

A check is then made in step S34 whether new or changed objects were found in the preceding distance image. If this is not the case, the method is continued with step S22.

Otherwise, in step S36, a position of the real object corresponding to the new object and of the changed object in the preceding distance image is determined. The new object is then treated as a known object whose position in the preceding cycle is known, for which purpose corresponding changes are carried out in data structures of the program and a corresponding Kalman filter is subsequently initialized for the preceding cycle. Furthermore, a repeat prediction of the position for the current cycle can take place for the changed object to improve the precision of the Kalman filter.

Object positions are therefore obtained in the current cycle for the preceding cycle and for the current cycle for objects known in the preceding cycle and newly found in step S32 so that, in step S22, an estimate of the speed of these objects can now take place, wherein the object positions in the preceding distance image or cycle can be used.

The further steps S24 to S28 run as in the first embodiment.

Since a speed can already be associated with the real object or pedestrian 26 in the current cycle, the initializing of the Kalman filter in the current cycle can as a result already take place on the basis of data for this object from the preceding cycle and thus overall with substantially more precise data, which substantially facilitates the following object recognition and tracking.

It is, for example, possible in this manner to associate a trajectory, and thus also a speed, with a pedestrian moving directly in front of a parking vehicle who then steps into the road, after the processing of only one distance image in which he was recognized as an individual object.

Generally, the methods of the first two embodiments can be combined. For example, an examination in accordance with step S30 can first take place and, if no new objects were found in step S34, a masking recognition in accordance with the first embodiment can take place.

Figure 7:
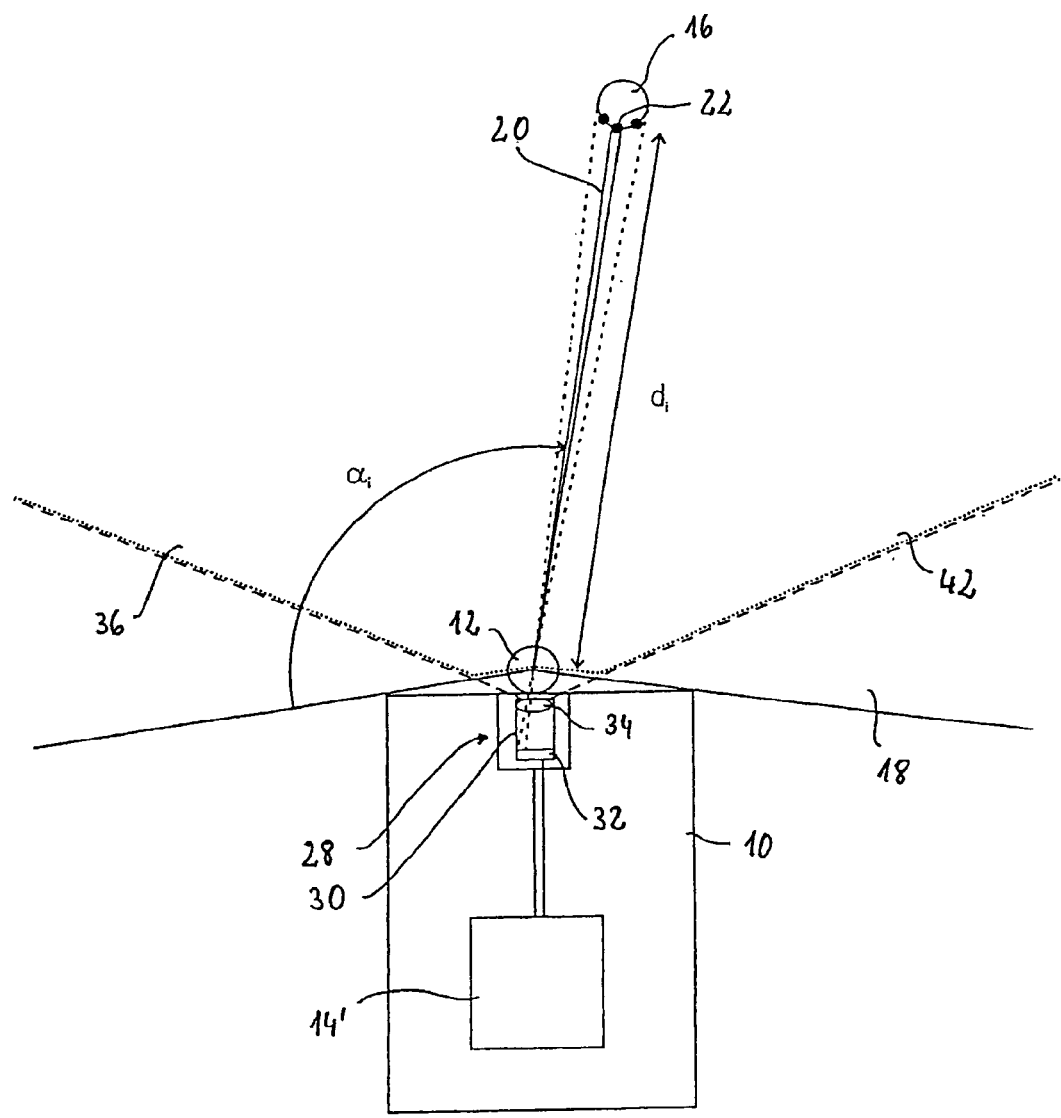
FIG. 7 shows a schematic plan view of a vehicle having an apparatus for the recognition and tracking of objects in accordance with a second preferred embodiment of the invention and of a real object located in front of the vehicle.
Figure 8:
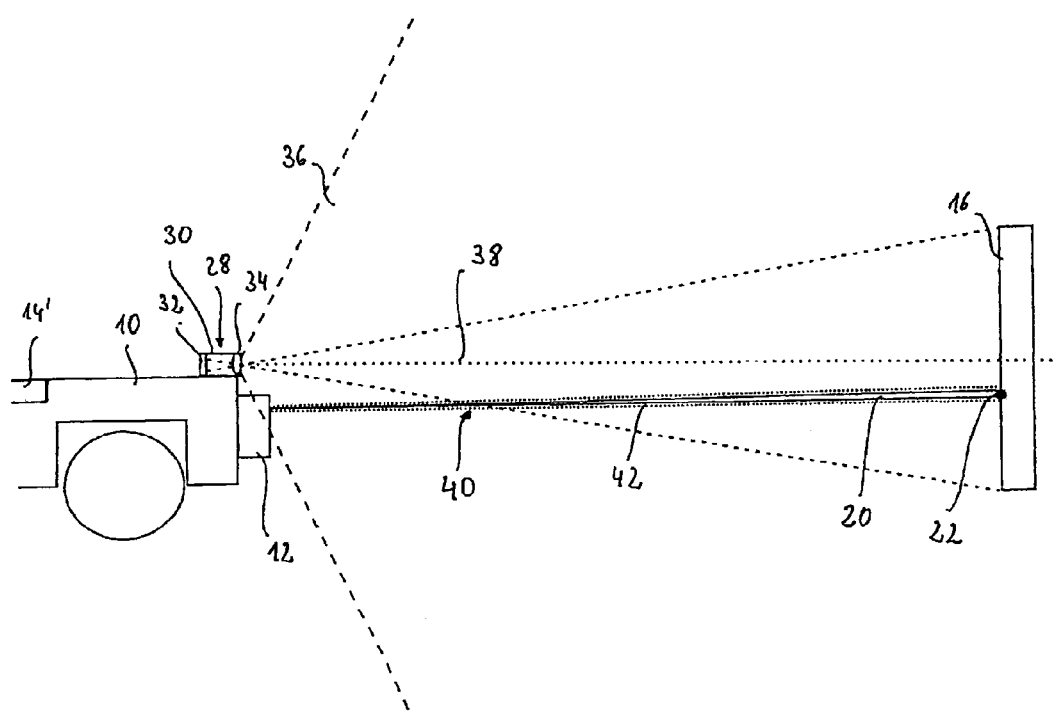
FIG. 8 shows a schematic part side view of the vehicle and of the real object in FIG. 7.

In FIGS. 7 and 8, a vehicle 10 is shown in a situation corresponding to the situation in FIG. 1, said vehicle carrying an apparatus for the recognition and tracking of objects in accordance with a third preferred embodiment of the invention.

The apparatus for the recognition and tracking of objects differs from the apparatus for the recognition and tracking of objects in the first embodiment in that, in addition to the laser scanner 12, a video system 30 is provided which, like the laser scanner 12, is connected via a corresponding data connection to a data processing apparatus 14' modified with respect to the data processing device 14 in the first embodiment. For the other, same parts or features, the same reference numerals are respectively used and the explanations on the first embodiment apply accordingly.

The video system 28 has a monocular video camera 30 which is a conventional black and white video camera with a CCD areal sensor 32 and an imaging apparatus which is shown schematically as a simple lens 34 in FIGS. 7 and 8, but which actually consists of a lens system and images light incident from a sensing zone 36 of the video system onto the CCD areal sensor 32. An optical axis 38 of the video camera 30 is inclined at a low angle, shown in an exaggeratedly large manner in FIG. 8, toward the scan plane 40 of the laser scanner 12 given by the pivot plane of the laser radiation bundle 20.

The CCD areal sensor 32 has photodetection elements which are arranged in a matrix and which are read out cyclically for the formation of video images with video picture elements. The video images first contain the respective position of the photodetection elements in the matrix or another identification for the photodetection elements and a respective intensity value corresponding to the intensity of the light received by the corresponding photodetection element for each picture element. The video images are sensed in this embodiment substantially synchronously with the distance images and thus at the same rate at which distance images are also sensed by the laser scanner 12.

Light starting from a real object, the person 16 in FIGS. 7 and 8, is imaged onto the CCD areal sensor 32 by the lens 34. This is indicated schematically in FIGS. 7 and 8 for the outlines of the real object or of the only schematically shown person 16 by the short-dashed lines.

From the spacing of the CCD areal sensor 32 and the lens 34 and from the position and the imaging properties of the lens 34, for example its focal length, a calculation can be made from the position of a real object point, e.g. of the real object point 22 on the person 16, at which point of the CCD areal sensor 32 or on which of the photodetection elements of the real subject point arranged as a matrix is imaged. Vice versa, a cone of rays indicated by the short-dashed lines in FIGS. 7 and 8, in which points or regions of a real object has to lie from which sensed radiation can be incident on the photodetection element, can be determined from the position of a photodetection element. A corresponding camera model can be used for this purpose. It is a case of a pinhole camera model known per se in the example.

A common sensing region 42 is shown approximately schematically by a dotted line in FIGS. 7 and 8 and is given by the section of the sensing zone 18 of the laser scanner 12 and of the sensing zone 36 of the video system 28.

The data processing device 14' differs from the data processing device 14, on the one hand, in that interfaces are provided to read in a respective current distance image and a current video image of the video system 28 substantially synchronously, i.e. within a time period which is considerably smaller than the time period Δt between successive scans of the sensing zone 18 of the laser scanner 12. On the other hand, the process is programmed with a computer program in accordance with a third preferred embodiment of the invention for the carrying out of a method in accordance with a third preferred embodiment of the invention. The programmed data processing device 14' therefore includes means for the evaluation of current images of the sensor, means for the determination of parts of a current image as the result of an at least preliminary evaluation of the current image or for the recognition of an object in the current cycle and means for the association of parts of an earlier image and/or for the determination of at least one indication with respect to an earlier state of the object or of a real object corresponding to in on the basis of a corresponding earlier image and association of the indication with the part of the current image or with the current object in the sense of the invention.

Figure 9:
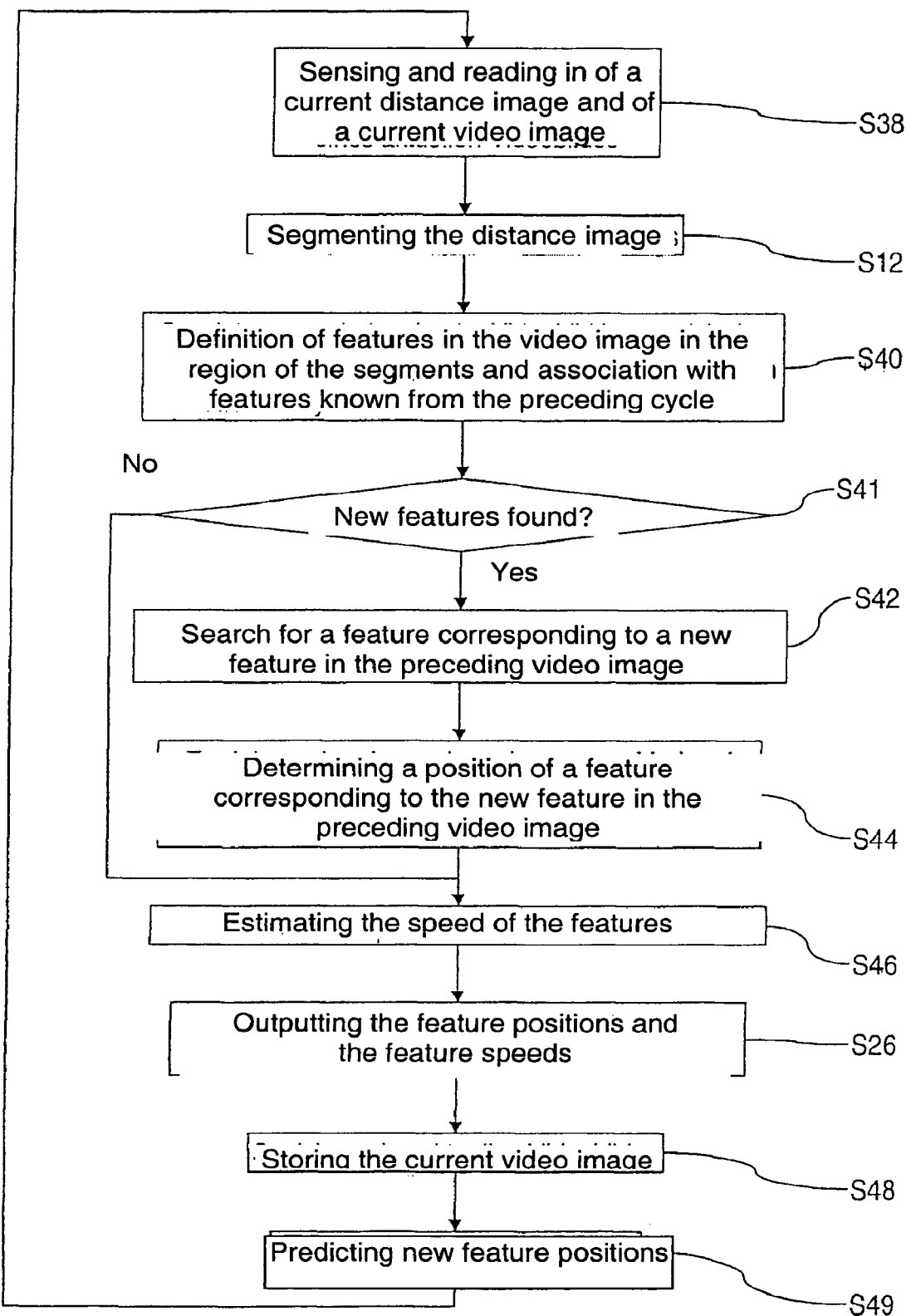
FIG. 9 shows a flowchart in which the procedure of a method in accordance with a third preferred embodiment of the invention is schematically illustrated.

The method illustrated in FIG. 9 in accordance with the third preferred embodiment of the invention is carried out on the basis of distance images or video images sensed substantially synchronously by the laser scanner 12 and the video system 28. In the method of this embodiment, features in the video images are recognized and tracked, with the video image processing, however, taking place on the basis of the distance images for computation time reasons, in that a search is only made for features in such sections of the video image in which distance picture elements of the distance image, and thus corresponding real object zones, lie.

First, in step S38, a current distance image and a current video image are read in and pre-processed. The reading in and the pre-processing of the images can be carried out in parallel or also in any desired order independently of one another for the two images.

A positional component for the formation of a complete position coordinate data set in three dimensions determined by the scan plane 40, in which the real object points corresponding to the distance picture elements lie, is added to the distance picture elements in the distance image in addition to the position coordinates in the scan plane 40. The position of a distance picture element is designated in the following by the position defined by these coordinate data.

Furthermore, after possible corrections of the video image, the data of the video image are transformed into the vehicle coordinate system in which the distance picture elements are also defined. For this purpose, a rectification of the video image data is carried out, for example for the elimination of distortion, and a transformation of the video picture elements to a picture plane is carried out. Positions in the vehicle coordinate system in a corresponding plane can then be associated with the video picture elements by means of the camera model for the video camera 30.

The current distance image and the current video image are stored for further use.

In step S12, the distance image is then segmented as in the first embodiment.

In the following step S40, features are detected in the video image, with only regions of the video image being used in which, according to the distance image, a real object corresponding to a segment in the distance image must be able to be sensed. More precisely, the detection only takes place in strips of the video image which have video picture elements corresponding to the distance picture elements in the segments, which extend substantially perpendicular to the scan plane of the laser scanner 12 and which each correspond to a segment of the distance image. The strips are defined in this process such that they extend in a direction orthogonal to the scan plane 40 of the laser scanner 12 over the total extent of the video image and have a width in the direction orthogonal thereto which is determined such that corresponding video picture elements lie in the respective strip for all distance picture elements of a respective segment. These video picture elements can be determined by using the camera model. Furthermore, in width, the strips have respectively pre-determined marginal regions at both sides of the respectively outermost video picture elements. Since other parts of the video image are initially ignored, an attention control of the video image processing takes place in this respect.

In this step, an association of features found in the current video image with features known from the preceding cycle further takes place using a position of the respective features predicted in each case for the current cycle in step S49 of the preceding cycle. Positions of the features are simultaneously determined in the current cycle.

In step S41, a check is then made as to whether new features were found which could not be associated with features known from the preceding cycle.

If new features are found, in step S42, a search is made for features corresponding to the new features in the preceding video image by a back tracking. Known methods of video image processing can be used for this purpose.

In step S44, the position of a feature corresponding to the new feature in the preceding video image is then determined.

In step S46, speeds of the features are then estimated on the basis of the positions of the features in the preceding video image and the positions of the features in the current video image.

The determined feature positions and feature speeds are thereupon output for further use in step S26 after storing.

In step S48, the current video image is then stored after the preceding video image was deleted.

In step S49, new feature positions are now predicted such that an association of features in step S40 in the following cycle with real objects is facilitated. For this purpose, for example, the speeds now known or also a Kalman filter can be used.

Starting from the at least preliminary evaluation of the distance image and video image in the steps S38, S12 and S40, a subsequent or additional evaluation of a preceding video image therefore takes place. The results of this evaluation, the feature found or its position in the preceding video image are then used in the current cycle to determine the speed of the current feature.

Figure 11A:
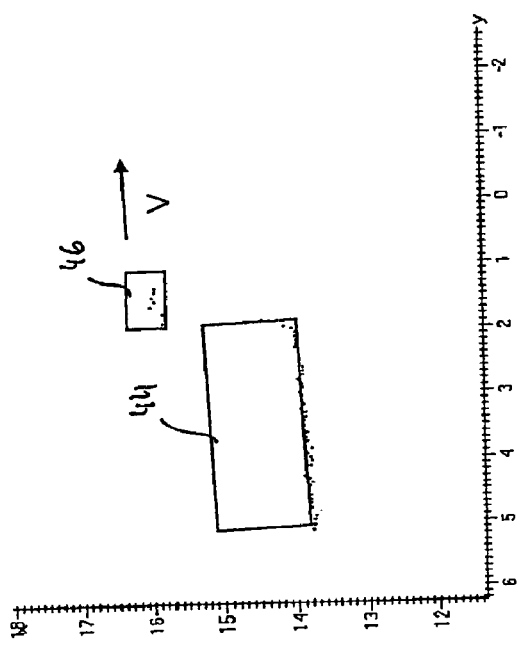
FIGS. 11A and 11B show distance images or video images corresponding to the images in FIGS. 10A and 10B at a later sensing time point.
Figure 11B:
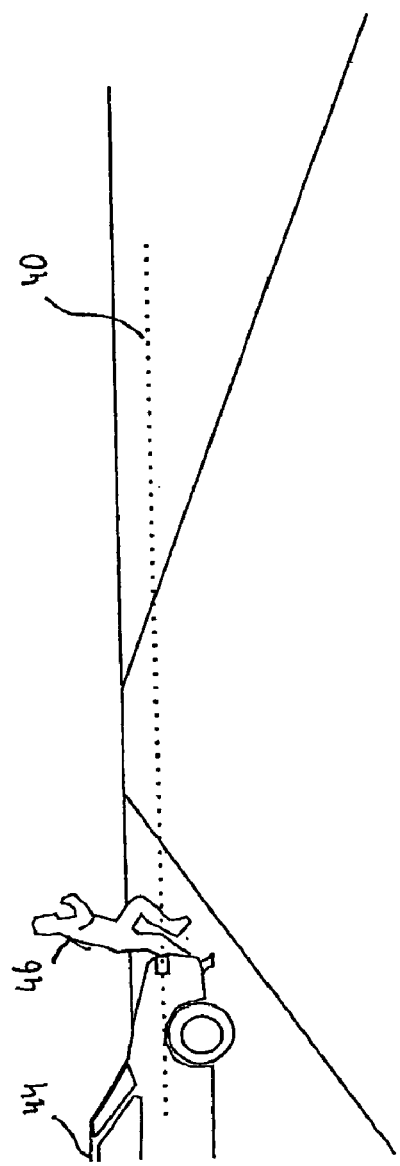

The use of the method for the recognition of pedestrians suddenly moving out from behind parking vehicles is shown in FIGS. 10A and 10B and 11A and 11B respectively. FIGS. 10A and 11A each show a section from successive distance images at the level of the scan plane 40 sensed by the laser scanner 12, whereas FIGS. 10B and 11B show sections from video images correspondingly sensed substantially synchronously with the video system 28. In these Figures, the scan plane 40 of the laser scanner 12 is shown by a dotted line. Furthermore, the Cartesian coordinate system used in FIGS. 10A and 10B corresponds to that in the preceding embodiments.

In FIGS. 10A and 11A, the vehicle is shown schematically by a rectangle 44 and the pedestrian is shown schematically by a rectangle 46.

First, the pedestrian, as shown in FIGS. 10A and 10B, cannot be sensed by the laser scanner 12 since he is masked by the vehicle 44. Since the sensing zone 36 of the video system 28, however, has a larger opening angle in the perpendicular direction to the scan plane 40 than the sensing zone 18 of the laser scanner 12, the pedestrian 46 can already be seen in the corresponding video image. However, due to the attention control, he is not detected in the video image since he is masked in the distance image (cf. FIG. 10A).

Since the pedestrian 46 in the example is moving to the right at a speed v, he is no longer masked by the vehicle 44 after some time, which is shown in FIGS. 11A and 11B. The pedestrian 46 can now be sensed in the distance image such that he is also detected in the video image via the attention control. Whereas, in a conventional video image processing, nothing but the position of the pedestrian 46 would now be known about him, in the method of the embodiment, the pedestrian 46 is tracked back in time in the video images, with him being able to be recognized again in the video image shown in FIG. 10B. The position thereby determined in the earlier video image now permits the speed of the of the pedestrian 46 initially only recognized in the current video image already to be determined on its first sensing or recognition. Since the back tracking only takes place when new features are located, the execution speed of the method is only reduced a little on average.

In a method of recognizing and tracking objects in accordance with a fourth preferred embodiment of the invention, the same apparatus for the recognition and tracking of objects as in the third embodiment is substantially used, with the programming of the data processing device 14', however, likewise being changed in accordance with the changed method. This also means that the means for the association of parts of an earlier image and/or for the determination of at least one indication with respect to an earlier state of the object or of a real object corresponding to it being modified on the basis of a corresponding earlier image and association of the indication with the part of the current image or with the current object.

Figure 12A:
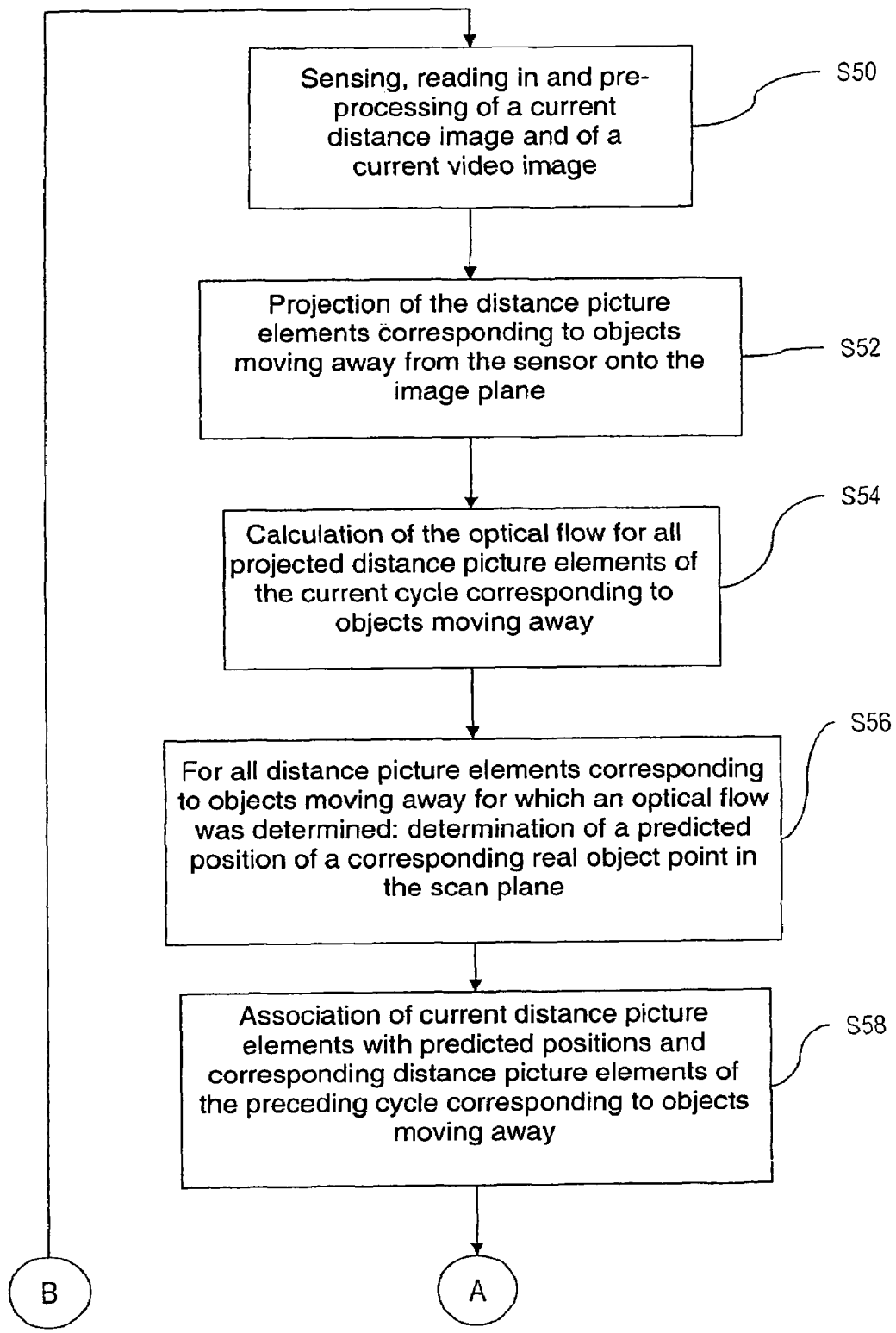
FIGS. 12A and 12B show a flowchart in which the procedure of a method in accordance with a fourth preferred embodiment of the invention is schematically illustrated.
Figure 12B:
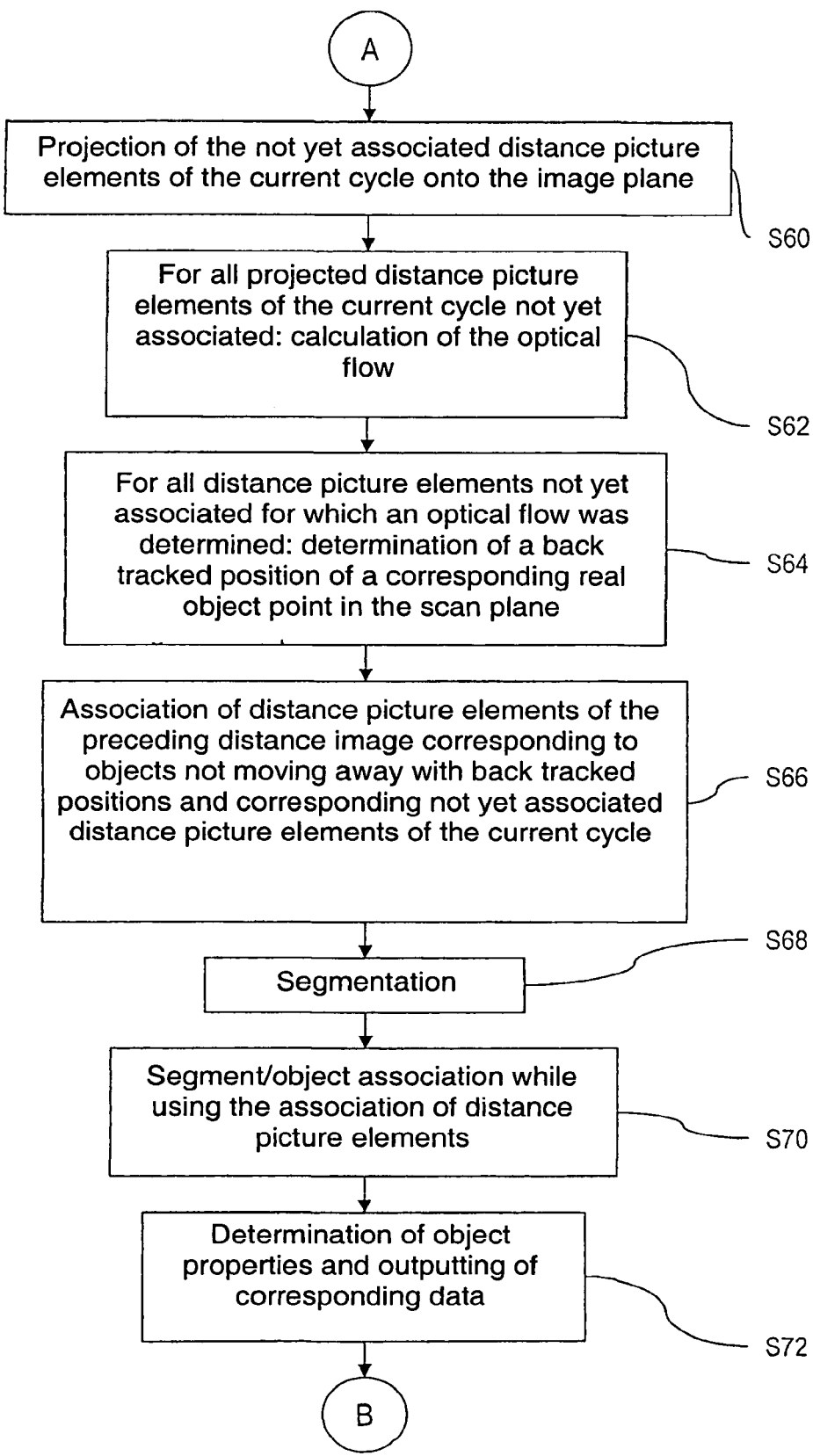

In this method illustrated schematically in FIGS. 12A and B, distance picture elements in successively sensed distance images are tracked in corresponding regions in video images substantially synchronously sensed with the distance images using the optical flow.

An association of objects and of distance picture elements representing them with one another is used such that a tracking of the objects can take place by tracking the corresponding distance picture elements associated with the object. With respect to details of some steps of the present method and with respect to possible variants, reference is made to the first embodiment and to the other embodiments in the German patent application with the applicant of the present application with the official file reference 103 12 249.4 whose content is herewith included in the present application by reference.

In step S50 of a current cycle, a current distance image and a current video image are first sensed and read into the data processing device in which a pre-processing of these images takes place corresponding to the step S38 in the preceding embodiment. The transformation of the video picture elements is, however, modified with respect to the step S38 in the preceding embodiment for the simpler calculation of the optical flow to the effect that the transformation of the video picture elements to a picture plane 48 used for the definition or calculation of an optical flow (cf. FIG. 13) is carried out. For a projection of distance picture elements into the image plane to be carried out in the steps S52 and S60, for reasons of simplicity, a modified pinhole camera model or focusing screen model for the video camera 30 is used which is generally known to the person skilled in the art and which is defined by the position of an optical center 50 and of the image plane 48 which serves as the surface for the definition or determination of the optical flow. The position of the optical center 50 is determined using the imaging geometry of the video camera 30, in particular the position relative to the laser scanner 12 and the focal length of the lens 34. The pinhole camera model is modified for the simplified representation in that the image plane 48 lies at a position fixed on the vehicle 10 relative to the video system 28 between the optical center 50 and the real object points, in FIG. 13, the points 52 and 58, and projects out of it at the optical center 50 by point mirror imaging of the actual image plane.

In step S52, which is omitted in the first cycle of the process, all distance picture elements of the cycle directly preceding the current cycle are initially determined which correspond to objects moving away from the sensor or from the laser scanner 12. For reasons of simplicity, these distance picture elements are designated as distance picture elements corresponding to objects moving away. Using the camera model, corresponding positions or coordinates of corresponding video picture elements in the image plane 48 are calculated and stored for use in the current cycle for these distance picture elements corresponding to objects moving away from the cycle directly preceding the current cycle. As illustrated geometrically in FIG. 13, the position respectively results by the point of intersection 54 of a straight line extending through the distance picture element, in the Figure the distance picture element 52, and through the optical center 50 with the image plane 48.

Figure 13:
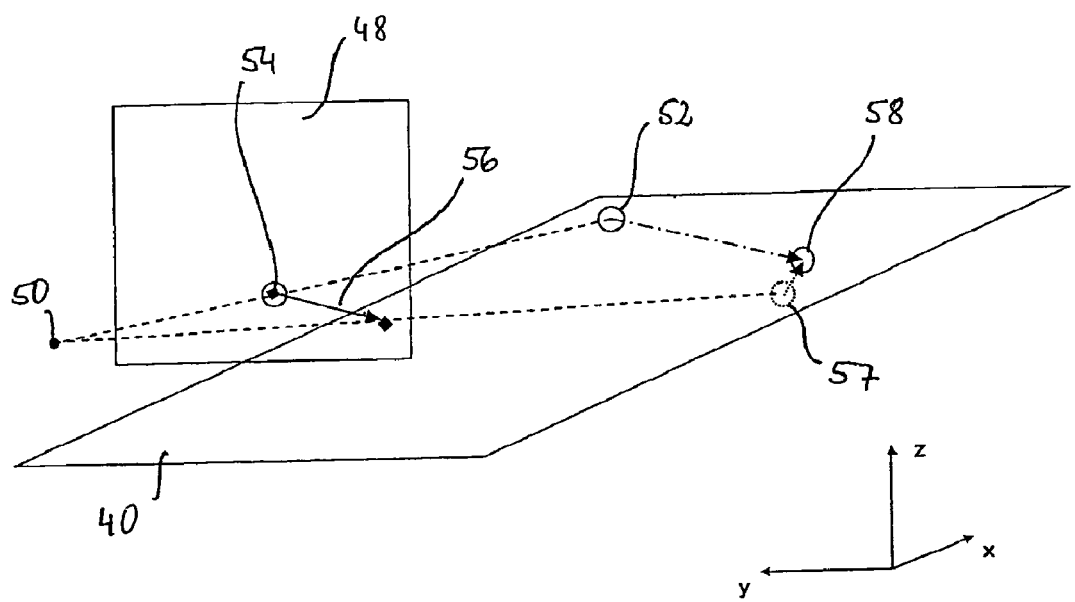
FIG. 13 shows a schematic, perspective representation of a part of a scan plane with a distance picture element, an imaging geometry for the computation of an optical flow and positions of sensed and predicted distance picture elements and of video picture elements and with a displacement vector corresponding to an optical flow occurring on the running of the method in FIGS. 12A and 12B.

In step S54, which is likewise omitted in the first cycle, corresponding current optical flow vectors, also only termed optical flows in the following, are determined for all projected distance picture elements of the preceding cycle or for corresponding points of intersection corresponding to objects moving away from the laser scanner 12 on the basis of the video image from the directly preceding cycle and from the current cycle and are converted into a displacement vector by multiplication by the cycle duration or the reciprocal of the scan frequency. In FIG. 13, this is shown for the distance picture element 52 for which an optical flow vector is determined at the point of intersection 54, said optical flow vector lying in the image plane 48 and resulting in a displacement vector 56 starting at the point of intersection 54 after scaling with the cycle time. The optical flow is determined by means of a differential process, in this example the Lukas and Canade process described in "Performance of optical flow techniques" by J. L. Barren, D. J. Fleed and S. S. Beauchemin, International Journal of Computervision, 12 (1), pages 43-77 (1994).

In step S56, a position of a corresponding real object point in the current cycle predicted by means of the optical flow is then determined in the scan plane 40 for all distance picture elements corresponding to objects moving away for which an optical flow was determined. For this purpose, the point of intersection 57 of a straight line with the scan plane 40 extending through the optical center 50 and the end point of the displacement vector 56 is illustrated geometrically in FIG. 13.

In step S58, current distance picture elements, in FIG. 13, for example, the current distance picture element 58, of the current distance image are associated with predicted positions and corresponding distance picture elements of the preceding image or cycle, provided this is possible. The fact can, for example, be used as the association criterion that that current distance picture element is associated whose square spacing between the predicted position and the actual current position is minimal in comparison with those of other current distance picture elements.

In step S60, the not yet associated distance picture elements of the current cycle, which accordingly have to correspond to real objects not moving away from the laser scanner 12, are then projected onto the image plane 48, which takes place analogously to the projection in step S52.

In step S62, optical flows are then calculated analogously to step S54 for all projected, not yet associated distance picture elements of the current cycle.

In step S64, a back tracked position of a corresponding real object point in the scan plan 40 is now determined for all not yet associated distance picture elements of the current cycle for which an optical flow was determined. The determination of the back tracked position takes place analogously to the determination of the predicted position in step S56, with a corresponding vector directed oppositely to the optical flow, however, being used as the displacement vector.

In step S66, an association of distance picture elements of the preceding cycle which correspond to objects not moving away from the sensor then takes place with back tracked positions then pre-determined and with corresponding not yet associated distance picture elements of the current cycle in step S64. The association can take place in accordance with a corresponding scheme, as in step S58, with distance picture elements of the preceding distance image, however, being associated with now pre-determined distance picture elements of the current cycle or with correspondingly back tracked positions.

In this manner, distance picture elements of the preceding cycle and of the current cycle or image are therefore associated with one another, with the association taking place for objects moving away from the laser scanner 12 such that current distance picture elements are associated with distance picture elements of the preceding image, while the remaining distance picture elements of the preceding image, which are associated with objects not moving away from the sensor or laser scanner 12, being associated with the not yet associated distance picture elements of the current cycle and of the distance image or of their back tracked positions.

In step S68, a segmentation of the current distance image now takes place in accordance with the segmentation in step S12 of the first embodiment.

In step S70, a segment/object association is then carried out, with the association of distance picture elements of the preceding distance image and of the current distance image and the association between distance picture elements of the preceding distance image and objects of the preceding cycle being used.

In step S72, object properties, in particular their positions and speeds, are determined and output.

The method can then be continued with step S50 in the next cycle. A prediction step can be omitted by the use of the optical flow.

In other variants of the method in accordance with the fourth embodiment, the projection can take place in another manner; examples for this are described in further embodiments in the patent application references which are herewith explicitly included in the description by reference.

A clearer association of distance picture elements is achieved by the different treatment of distance picture elements which correspond to real objects not moving away from the laser scanner 12. For in the current cycle, respectively more distance picture elements will correspond to such real objects than in the preceding cycle due to the imaging geometry of the laser scanner 12 which scans its sensing zone 18 radially. An association of a plurality of distance picture elements of the current cycle with, for example, a pre-determined distance picture element of the preceding cycle can then be avoided in which the case can occur for objects approaching the laser scanner that a plurality of distance picture elements of the current image would have to be associated with a predicted distance picture element, which can, however, bring along a complicated association process due to the ambiguity.

In a method in accordance with a fifth preferred embodiment of the invention, an object recognition and tracking only takes place on the basis of video images. A corresponding apparatus for object recognition and tracking in accordance with a fifth preferred embodiment of the invention therefore includes a video system used as in the preceding two embodiments whose video camera is connected to a data processing device as in the preceding two embodiments, but which is programmed to carry out the method in accordance with the fifth preferred embodiment. This also means that the means for the association of parts of an earlier image and/or for the determination of at least one indication with respect to an earlier state of the object or of a real object corresponding to it are modified on the basis of a corresponding earlier image and for the association of the indication with the part of the current image or with the current object. The laser scanner 12 is omitted.

Figure 14:
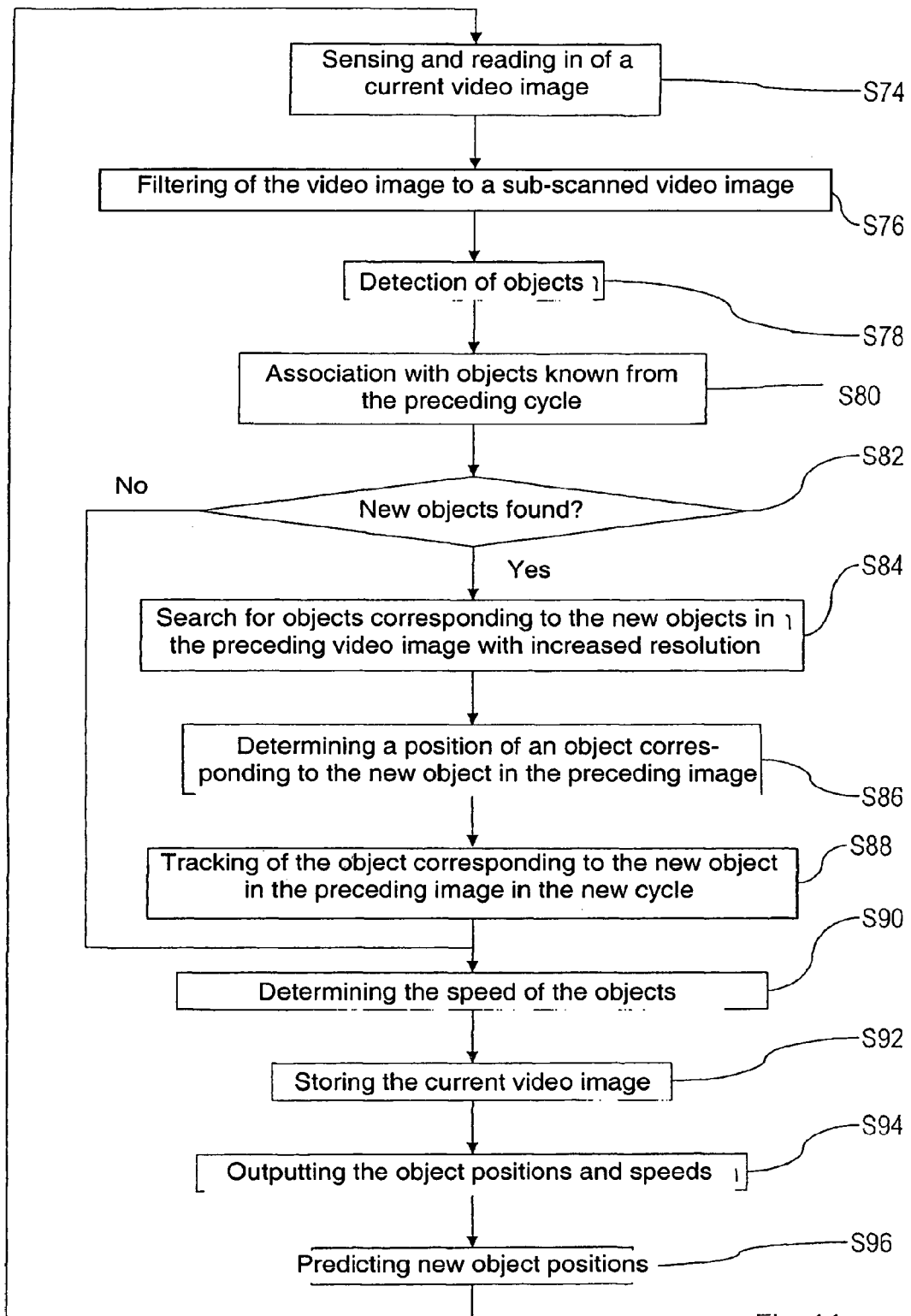
FIG. 14 shows a flowchart in which the procedure of a method in accordance with a fifth preferred embodiment of the invention is schematically illustrated.

In this process illustrated in FIG. 14, in step S74, a current video image is sensed and read in a current cycle. A corresponding pre-processing of the video image data can take place as in the preceding two embodiments.

In step S76, the read-in video image is subjected to a filtering reducing the image resolution in order to increase the processing speed, said filtering consisting of the fact in the present embodiment that in each case only that pixel in the bottom left corner is used from 4×4 blocks of video picture elements or pixels.

In step S78, objects in the sub-scanned video image are then detected. For this purpose, conventional methods of object recognition and tracking in video images can be used.

In step S80, an association of the detected objects with objects from the preceding cycle now takes place. The association takes place in the example on the basis of predicted object positions for the current cycle which were determined by means of known association methods in the preceding cycling in a step S94.

In step S82, a check is made whether new objects were recognized which could not be associated with any of the objects of the preceding cycle. If no new objects were detected, the method is continued with step S90.

Otherwise, a search is first made in step S84 in the preceding video image, which is not sub-scanned or, in the example, is only sub-scanned half as strongly as the image generated in step S76, for an object which corresponds to a new object.

Due to the increased resolution, objects are thus also detectable in the preceding video image which would otherwise not be able to be recognized due to the sub-scanning.

Figure 15A:
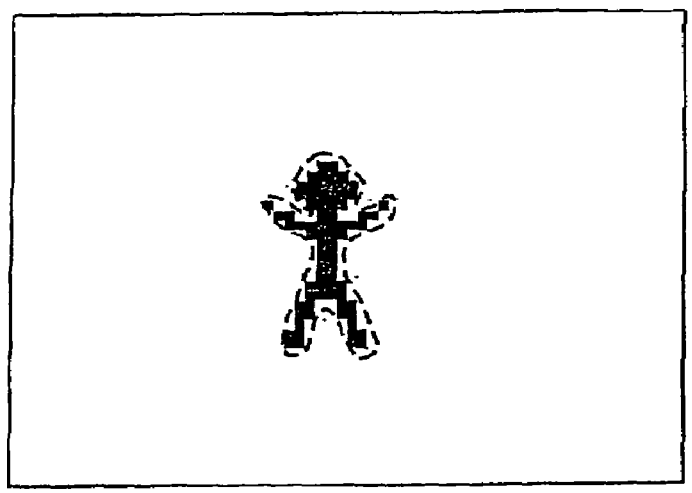
FIGS. 15A, 15B show sections from an unfiltered video image and a filtered video image with a schematically represented pedestrian at a first point in time.
Figure 15B:
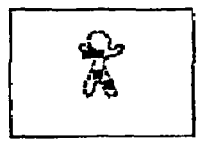
Figure 16:
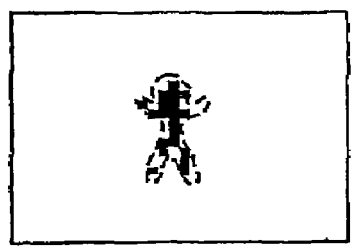
FIG. 16 shows an unfiltered image of the pedestrian in FIG. 15 at an earlier point in time.

This is shown in FIGS. 15A and 15B and in 16 again for a person approaching the video system. In FIG. 15A, the person is shown schematically in a current video image of full resolution, with black rectangles representing video picture elements or pixels which correspond to the person. The sub-scanned video image shown in FIG. 15B in which the person is only represented by four individual pixels results from the aforementioned sub-scanning. If the person has now approached the video camera from a larger distance, he can have the size shown in FIG. 16, for example, in the preceding video image with full resolution, with no pixel remaining after sub-scanning by means of which a corresponding object could be detectable.

In the method used here, however, a search is made for the new object in the preceding image in full resolution and not in the reduced resolution, said object therefore also being able to be found. Since the new object or the real object can only occur in the proximity of the object detected in the current video image, the computation time for the recognition of the object in the preceding video image is nevertheless greatly reduced.

In step S88, the objects in the preceding video image corresponding to the new objects are tracked into the current cycle, which is possible without problem since the corresponding object was already detected in the sub-scanned current video image.

Due to the determined positions of the objects in the preceding video image, and thus in the preceding cycle and in the current cycle, in step S90, speeds of the objects can now be determined by estimation or by forming of a difference.

In step S92, the current video image is then stored, with the preceding video image being deleted.

In step S94, an output of the object positions and speeds takes place for use in the following applications.

In step S96, on the basis of the object positions and speeds, new object positions are then predicted for the following cycle in whose proximity a search is made for objects in the video image of the following cycle. A Kalman filter can again be used for this purpose.

The method in accordance with the fifth embodiment, on the one hand, permits a high speed of execution thanks to the sub-scanning. On the other hand, it is, however, possible for approaching new objects, and thus objects critical for a vehicle, to determine their speeds using an earlier video image on their first occurrence so that, in a situation of danger, the reaction time can be cut by one cycle period.

REFERENCE NUMERAL LIST

10 vehicle
12 laser scanner
14, 14' data processing device
16 object
18 sensing zone
20 laser radiation bundle
22 real object point
24 vehicle
26 pedestrian
28 video system
30 video camera
32 CCD areal sensor
34 lens
36 sensing zone
38 optical axis
40 scan plane
42 common sensing zone
44 vehicle
46 person
48 image plane
50 optical center
52 real object point
54 point of intersection
56 displacement vector
57 point of intersection
58 real object point
v speed vector
d displacement vector The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of recognizing and tracking objects which correspond to real objects in at least one sensing zone of at least one sensor for electromagnetic radiation on the basis of images of the sensing zone repeatedly sensed by means of the sensor, wherein successive images are evaluated in successive cycles and a respective search is made in a later cycle in a corresponding later image for at least one object found in a cycle on the basis of at least one corresponding image in order to track it, and wherein, upon the recognition of a new object in a current image of a current cycle, an earlier image in the successive images is at least partly reevaluated on the basis of the results of an at least preliminary evaluation of the current image, and wherein, during the current cycle, at least one part of an earlier image or at least one indication with respect to an earlier state of the object or of a real object corresponding to it, which indication is determined using the corresponding earlier image in the current cycle, is associated with at least one part of a current image determined in the current cycle or with an object recognized in the current cycle wherein distance images and video images of at least one common part region of the sensing zone are used which are associated with one another in time; in that a search is made in video images for objects or features only in part sections which are determined in dependence on distance picture elements associated in time; in that, in a current cycle, the new object or feature in the video image is tracked back in time to an earlier cycle; and in that a position of the real object corresponding to the new object or feature in the earlier cycle is determined while using the information on an object or feature corresponding to the real object in the earlier video image.

2. A method in accordance with claim 1, wherein the association of the part of the earlier image or of the indication with respect to the earlier state of the object is used for the determination of a further indication with respect to the current state of an object.

3. A method in accordance with claim 1, wherein a current position of the new object in the current cycle is determined in that an earlier position of the new object or of a real object corresponding to it in an earlier cycle is estimated on the basis of the current position of the new object; and in that the current value of a state parameter of the new object in the current cycle is determined using the estimated earlier position of the new object.

4. A method in accordance with claim 3, wherein a check is made on the basis of the current position of the new object in the current cycle and of an earlier position of at least one other object in an earlier cycle whether the real object corresponding to the new object in the image evaluated in the earlier cycle could be masked by a real object corresponding to the other object in the earlier cycle.

5. A method in accordance with claim 4, wherein at least one of a current size and shape are determined for the new object in the current cycle; and in that the at least one current size and shape are used in the check for masking.

6. A method in accordance with claim 4, wherein, when a masking is assumed, an earlier position of the real object corresponding to the new object in the earlier cycle is estimated from the current position and preferably from at least one of the current size and shape of the object corresponding to the real object causing the masking and a current speed of the new object is estimated from this.

7. A method in accordance with claim 3, wherein a search is made for the new object in an earlier image; and in that, if the new object is found in an earlier image in the current cycle, a current value of at least one state parameter for the new object or for another object is determined while using an earlier value of the state parameter for at least one of the new object and for the other object in the earlier cycle.

8. A method in accordance with claim 7, wherein the images are segmented using pre-determined segmentation parameters and a pre-determined segmentation method; and in that at least one corresponding region of the earlier image is segmented again using at least one of changed segmentation parameters and another segmentation method for the finding of the new object in the earlier image.

9. A method of recognizing and tracking objects which correspond to real objects in at least one sensing zone of at least one sensor for electromagnetic radiation on the basis of images of the sensing zone repeatedly sensed by means of the sensor, wherein successive images are evaluated in successive cycles and a respective search is made in a later cycle in a corresponding later image for at least one object found in a cycle on the basis of at least one corresponding image in order to track it, and wherein at least one part of an earlier image or at least one indication with respect to an earlier state of the object or of a real object corresponding to it, which indication is determined using a corresponding earlier image in the current cycle, is associated with at least one part of a current image determined in the current cycle or with an object recognized in the current cycle during at least one current cycle on the basis of the results of an at least preliminary evaluation of current image;

wherein distance images and video images of at least one common part region of the sensing zone are used which are associated with one another in time;

wherein distance picture elements in a current distance image are associated with distance picture elements in an earlier distance image in that a displacement or displacement speed, in particular an optical flow, is determined for at least one region corresponding to a distance picture element in the earlier distance image or for at least one feature of the corresponding earlier video image or of the current video image corresponding to a distance picture element in the earlier image; and wherein the displacement or displacement speed, in particular the optical flow, is used for the association of a distance picture element in the current distance image with the distance picture element in the earlier distance image, wherein distance picture elements in the preceding cycle are associated with distance picture elements in the current cycle, while using the corresponding displacement or displacement speed of the region or of the feature, in particular of the corresponding optical flow, for objects in the distance image which approach the sensor sensing the distance images or have more distance picture elements in a current cycle than in an earlier cycle.

10. A method in accordance with claim 1, wherein, in the object recognition, the detection of objects is carried out on the basis of filtered images which have a reduced resolution due to the filtering; and in that, after detection of the new object in the current cycle, a search is made on the basis of the position and, optionally, shape of the object in the current filtered image for a real object in an earlier image corresponding to the object, the resolution of said earlier image being higher than that of the filtered image; and in that, on finding a corresponding object in the earlier image, corresponding data on the object are used in the evaluation of the current image.

11. A computer program stored on a computer readable medium with program code means to carry out a method of recognizing or tracking objects which correspond to real objects in at least one sensing zone of at least one sensor for electromagnetic radiation on the basis of images of the sensing zone repeatedly sensed by means of the sensor, wherein successive images are evaluated in successive cycles and a respective search is made in a later cycle in a corresponding later image for at least one object found in a cycle on the basis of at least one corresponding image in order to track it, wherein, upon the recognition of a new object in a current image of a current cycle, an earlier image in the successive images is at least partly re-evaluated on the basis of the results of an at least preliminary evaluation of the current image, and wherein during the current cycle, at least on part of the earlier image or at least one indication with respect to an earlier state of the object or of a real object corresponding to it, which indication is determined using the corresponding earlier image in the current cycle, is associated with at least one part of a current image determined in the current cycle or with an object recognized in the current cycle wherein distance images and video images of at least one common part region of the sensing zone are used which are associated with one another in time; in that a search is made in video images for objects or features only in part sections which are determined in dependence on distance picture elements associated in time; in that, in a current cycle, the new object or feature in the video image is tracked back in time to an earlier cycle; and in that a position of the real object corresponding to the new object or feature in the earlier cycle is determined while using the information on an object or feature corresponding to the real object in the earlier video image.

12. A computer program product stored on a computer readable medium with program code means which are stored on a computer legible data carrier to carry out a method of recognizing or tracking objects which correspond to real objects in at least one sensing zone of at least one sensor for electromagnetic radiation on the basis of images of the sensing zone repeatedly sensed by means of the sensor, wherein successive images are evaluated in successive cycles and a respective search is made in a later cycle in a corresponding later image for at least one object found in a cycle on the basis of at least one corresponding image in order to track it, wherein, upon the recognition of a new object in a current image of a current cycle, an earlier image in the successive images is at least partly re-evaluated on the basis of the results of an at least preliminary evaluation of the current image, and wherein during the current cycle, at least on part of the earlier image or at least one indication with respect to an earlier state of the object or of a real object corresponding to it, which indication is determined using the corresponding earlier image in the current cycle, is associated with at least one part of a current image determined in the current cycle or with an object recognized in the current cycle wherein distance images and video images of at least one common part region of the sensing zone are used which are associated with one another in time; in that a search is made in video images for objects or features only in part sections which are determined in dependence on distance picture elements associated in time; in that, in a current cycle, the new object or feature in the video image is tracked back in time to an earlier cycle; and in that a position of the real object corresponding to the new object or feature in the earlier cycle is determined while using the information on an object or feature corresponding to the real object in the earlier video image.

13. An apparatus for recognizing and tracking objects having at least one sensor for electromagnetic radiation designed to sense images of a sensing zone and having a data processing device which is connected to the sensor and is adapted to carry out a method of recognizing or tracking objects which correspond to real objects in at least one sensing zone of at least one sensor for electromagnetic radiation on the basis of images of the sensing zone repeatedly sensed by means of the sensor, wherein successive images are evaluated in successive cycles and a respective search is made in a later cycle in a corresponding later image for at least one object found in a cycle on the basis of at least one corresponding image in order to track it, wherein, upon the recognition of a new object in a current image of a current cycle, an earlier image in the successive images is at least partly re-evaluated on the basis of the results of an at least preliminary evaluation of the current image, and wherein during the current cycle, at least on part of the earlier image or at least one indication with respect to an earlier state of the object or of a real object corresponding to it, which indication is determined using the corresponding earlier image in the current cycle, is associated with at least one part of a current image determined in the current cycle or with an object recognized in the current cycle wherein distance images and video images of at least one common part region of the sensing zone are used which are associated with one another in time; in that a search is made in video images for objects or features only in part sections which are determined in dependence on distance picture elements associated in time; in that, in a current cycle, the new object or feature in the video image is tracked back in time to an earlier cycle; and in that a position of the real object corresponding to the new object or feature in the earlier cycle is determined while using the information on an object or feature corresponding to the real object in the earlier video image.

14. An apparatus in accordance with claim 13, wherein said data processing device includes means for the evaluation of current images of the sensor, means for the determination of parts of a current image as a result of an at least preliminary evaluation of the current image or for the recognition of an object in the current cycle and means for the association of parts of an earlier image or for the determination of at least one indication with respect to an earlier state of the object or of a real object corresponding to it while using a corresponding earlier image in the current cycle and association of the indication with the part of the current image or with the current object.

15. An apparatus in accordance with claim 13, wherein the sensor is made for the sensing of distance images, in particular as a laser scanner.

* * * * *